(12) United States Patent
Lazarev et al.

(10) Patent No.: US 7,456,915 B2
(45) Date of Patent: Nov. 25, 2008

(54) LIQUID CRYSTAL DISPLAY PANEL WITH BROADBAND INTERFERENCE POLARIZERS

(75) Inventors: Pavel I. Lazarev, London (GB); Michael V. Paukshto, Foster City, CA (US)

(73) Assignee: Nitto Denko Corporation, Ibaraki-Shi (JP)

( * ) Notice: Subject to any disclaimer, the term of this patent is extended or adjusted under 35 U.S.C. 154(b) by 341 days.

(21) Appl. No.: 11/071,411

(22) Filed: Mar. 2, 2005

(65) Prior Publication Data

US 2005/0212993 A1    Sep. 29, 2005

Related U.S. Application Data

(60) Provisional application No. 60/557,095, filed on Mar. 26, 2004.

(51) Int. Cl.
*G02F 1/1335* (2006.01)
(52) U.S. Cl. .................... 349/62; 349/96; 349/165; 428/1.1
(58) Field of Classification Search ........... 349/106, 349/62, 96, 165; 428/1.1, 1.3
See application file for complete search history.

(56) References Cited

U.S. PATENT DOCUMENTS

| | | | | |
|---|---|---|---|---|
| 4,211,473 | A * | 7/1980 | Shanks | 349/164 |
| 5,882,774 | A * | 3/1999 | Jonza et al. | 428/212 |
| 6,333,773 | B1 * | 12/2001 | Faris | 349/176 |
| 6,744,480 | B2 | 6/2004 | Kaneko | |

(Continued)

FOREIGN PATENT DOCUMENTS

EP    1430334    6/2004

(Continued)

OTHER PUBLICATIONS

Ignatov, Leonid, et al. Thin Crystal Film Polarizers and Retarders. Liquid Crystal Materials, Devices and Applications VIII. Proceedings of SPIE vol. 4658 (2002). pp. 79-90.*

(Continued)

*Primary Examiner*—David C. Nelms
*Assistant Examiner*—Nathanael R Briggs
(74) *Attorney, Agent, or Firm*—Westerman, Hattori, Daniels & Adrian, LLP.

(57) ABSTRACT

The present invention relates to a liquid crystal display panel with improved image contrast comprising an array of pixel regions and a sequence of a recycling backlight structure comprising broadband rear interference polar (RI-Polar) having a transmission axis AB with preset orientation, a spatial intensity modulation structure comprising a broadband front interference polar (FI-Polar) having a transmission axis approximately parallel to the transmission axis AB, a spectral filtering structure, and antireflection means. Each said pixel region spatially encompasses a plurality of subpixel regions. The RI-Polar and FI-Polar are multilayer structures of stacked layers. At least one layer of each structure is optically anisotropic, made by means of Cascade Crystallization Process and characterized by a globally ordered biaxial crystalline structure with an intermolecular spacing of 3.4±0.3 Å in the direction approximately parallel to the transmission axis AB. Said layer is transparent in the wavelength band of visible light, and is formed by rodlike supramolecules, which represent at least one polycyclic organic compound with a conjugated π-system and ionogenic groups.

20 Claims, 19 Drawing Sheets

U.S. PATENT DOCUMENTS

| | | | |
|---|---|---|---|
| 6,905,220 B2 * | 6/2005 | Wortman et al. | 362/627 |
| 7,045,177 B2 * | 5/2006 | Dutova et al. | 428/1.1 |
| 7,088,406 B2 * | 8/2006 | Yun et al. | 349/114 |
| 7,166,161 B2 * | 1/2007 | Lazarev et al. | 117/4 |
| 2002/0176036 A1 | 11/2002 | Kaneko | |
| 2003/0001993 A1 | 1/2003 | Iijima | |
| 2003/0090012 A1 | 5/2003 | Allen et al. | |
| 2005/0195340 A1 * | 9/2005 | Lazarev | 349/62 |
| 2005/0200771 A1 * | 9/2005 | Lazarev et al. | 349/62 |
| 2005/0231661 A1 * | 10/2005 | Lazarev et al. | 349/106 |

FOREIGN PATENT DOCUMENTS

| | | |
|---|---|---|
| JP | 11-142646 A | 5/1999 |
| JP | 2000-292788 A | 10/2000 |
| JP | 2002-341343 A | 11/2002 |
| JP | 2002-365625 A | 12/2002 |
| JP | 2003-15133 A | 1/2003 |
| JP | 2003-43475 A | 2/2003 |
| JP | 2004-12969 A | 1/2004 |
| JP | 2004-38204 A | 2/2004 |
| JP | 2004-109986 A | 4/2004 |
| JP | 2004-212782 A | 7/2004 |
| JP | 2004-219800 A | 8/2004 |
| JP | 2005-504333 A | 2/2005 |
| WO | WO 03/027731 A1 | 4/2003 |

OTHER PUBLICATIONS

Form PCT/ISA/210 International Search Report PCT/JP2005/017241 dated Nov. 8, 2005.

Form PCT/ISA/220 Transmittal PCT/JP2005/017241 dated Nov. 8, 2005.

Form PCT/ISA/237 Written Opinion PCT/JP2005/017241 dated Nov. 8, 2005.

* cited by examiner

LIQUID CRYSTAL DISPLAY PANEL WITH BROADBAND INTERFERENCE POLARIZERS

CROSS REFERENCE TO RELATED APPLICATIONS

This application claims the priority of the U.S. Provisional Patent Application Ser. No. 60/557,095, filed Mar. 26, 2004, the disclosure of which is hereby incorporated by reference in its entirety.

FIELD OF THE INVENTION

The present invention relates to the field of liquid crystal displays, in particular, to a high-brightness color liquid crystal display panel with improved image contrast employing non-absorbing interference color filters and light recycling among neighboring subpixels.

BACKGROUND OF THE INVENTION

There is a great demand for flat liquid crystal display (LCD) panels capable of displaying video images with improved contrast. Examples of equipment requiring such display structures for direct viewing include notebook, laptop, other computers and flat screen television sets.

In general, conventional color LCD panels have essentially the same basic construction. Each LCD display panel comprises the following main components: a backlight structure for producing a plane of uniform lighting intensity; an electrically-addressable array of control elements producing modulation of the intensity of light; and an array of color filters located in the neighborhood of the array of modulating elements, producing spectral filtering of the modulated light in order to form a color image.

In color LCD panel design, the goal is to provide for a maximum percentage transmission of light from the backlight structure through the color filter array. However, using prior art design and technology, it is impossible to achieve this goal because of significant losses in light transmission caused by the following factors: losses of light energy due to absorption-type polarizers used in the LCD panels; absorption of light reflected from thin-film transistors (TFTs) and wiring of the pixelated spatial intensity modulation arrays used in the LCD panels; absorption of light by pigments used in the spectral filters of the LCD panels; and Fresnel losses due to mismatch of refractive indices between layers within the LCD panels. As a result of such factors, the light transmission efficiency of prior art color LCD panels is typically not greater than 5%. Consequently, up to 95% of the light produced by the backlight structure is converted into heat across the LCD panel. Thus, it is not possible to obtain high-brightness images using prior art color LCD panels in either direct or projection display systems without using ultra-high intensity backlight sources which require high supplied power and produce great amounts of heat necessitating adequate cooling measures and the like.

In response to the drawbacks of prior art color LCD panel designs, several alternative approaches have been proposed to improve the light transmission efficiency of the panel and thus increase the brightness of produced images.

For example, the LCD panel employing cholesteric liquid crystal (CLC) polarizers is used to replace absorbing dye polarizers of prior art LCD panels to obtain improved color purity. Another LCD panel employs a scheme of partial light recycling in order to improve the brightness of the LCD panel. Another LCD panel uses a holographic diffuser for extracting light from a light guiding panel of the backlight structure and CLC polarizers for the local recycling of light diffusely scattered by the holographic diffuser in order to improve the brightness of the LCD panel.

However, such prior art color LCD panels, are still not free of shortcomings and drawbacks. In particular, despite the use of non-absorbing CLC polarizers and localized light recycling principles, prior art LCD panels continue to require at least one light absorbing layer along the optical path extending from the backlight structure to the viewer. Consequently, prior art LCD panels have very low light transmission efficiencies. Thus, the formation of high-brightness color images using prior art LCD panels required high-intensity backlight sources which consume very high electric power, produce large amounts of heat, and necessitate the use of fans and other cooling measures to maintain the temperature of both the LCD panel and the lamp(s) in the backlight structure within safe operating limits.

Known is a broadband birefringent reflective polarizer comprising a birefringent material arranged in optical repeating units disposed spatially along a thickness axis of the reflective polarizer. The birefringent reflective polarizer may be fabricated of polymer materials in the form of a multilayered sheet or film by means of established coextrusion techniques. This method has some limitations. The polymers should be suitable for use in the practice of this method so that the polymers have stress optical coefficients which provide the necessary refractive index mismatch in at least one plane when the polymers are oriented. Thus, not any pair of polymer materials can be used. Not all polymer materials are compatible for coextrusion. Many polymers can be stretched at temperatures above the glass transition temperature. The method of fabrication of a reflective polarizer is a hyperthermal method. The reflective polarizer can only be produced independently (separately) and the method of its fabrication cannot be integrated, for example, into process of fabrication of the display or another device.

Thus, there is a great need for an improved color LCD panel capable of producing high brightness color images without shortcomings and drawbacks of the prior art LCD panel devices.

SUMMARY OF THE INVENTION

The present invention is directed to a liquid crystal display panel with improved image contrast. It comprises an array of pixel regions and a sequence of: a recycling backlight structure, a spatial intensity modulation structure, and a spectral filtering structure associated with each said pixel region. Said recycling backlight structure comprises broadband rear interference polar (RI-Polar) having a transmission axis AB with preset orientation. Said spatial intensity modulation structure comprises a broadband front interference polar (FI-Polar) having a transmission axis approximately parallel to the transmission axis AB. The RI-Polar and FI-Polar are multilayer structures of stacked layers. At least one layer of each multilayer structure is optically anisotropic, and is made by means of Cascade Crystallization Process. Said layer is characterized by a globally ordered biaxial crystalline structure with an intermolecular spacing of $3.4\pm0.3$ Å in the direction approximately parallel to the transmission axis AB. This layer is transparent in the wavelength band of visible light, and is formed by rodlike supramolecules which represent at least one polycyclic organic compound with a conjugated $\pi$-system and ionogenic groups.

BRIEF DESCRIPTION OF THE DRAWINGS

A more complete description of the present invention and its numerous advantages will be readily understood by reference to the following detailed description considered in connection with the accompanying drawings, all of which forms a part of the disclosure.

DETAILED DESCRIPTION OF THE INVENTION

Having generally described the present invention, a further understanding can be obtained by reference to the specific preferred embodiments, which are provided herein for purposes of illustration only and are not intended to limit the scope of the appended claims.

Figure 1:
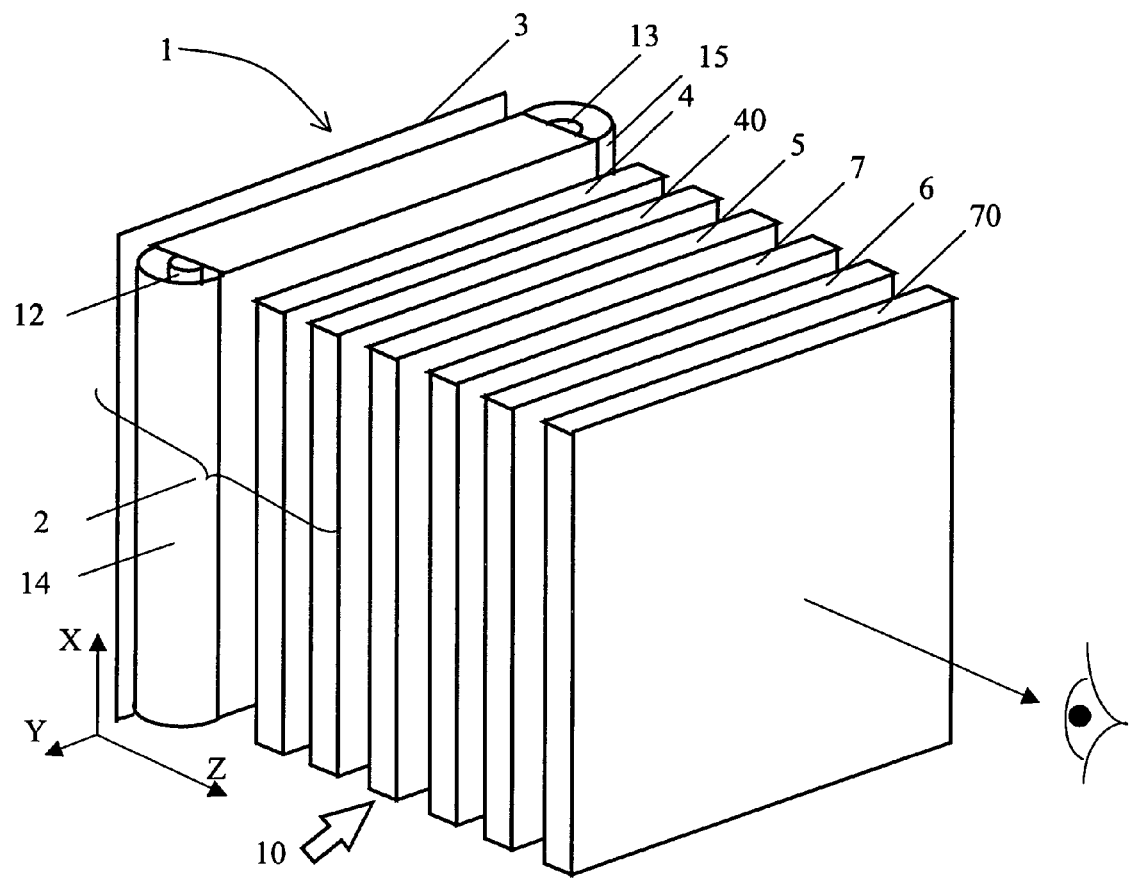
FIG. 1 shows the diagram of the generalized LCD panel construction according to the present invention.

In FIG. 1, a subcomponent structure of the first generalized embodiment of the LCD panel according to the present invention is shown for greater clarity. The first generalized embodiment of the LCD panel 1 comprises: a recycling backlight structure 2 comprising a quasi-diffusive reflector 3 producing a broadband light flux having a substantially uniform intensity over the x and y coordinate axes, a broadband rear interference polar (RI-Polar) 4, and a rear broadband sheet polarizer 40; a spatial intensity modulation structure comprising an array of polarization direction rotating elements 5 for spatial intensity modulation of light emitted from the backlight structure and a broadband front interference polar (FI-Polar) 7; a spatial filtering structure comprising a pixelated array of color filters 6 for spectral filtering of light produced by the backlight structure; and a antireflection means (70) for cooperative operation with the array of polarization direction rotating elements 5 and the pixelated array of color filters 6. A front broadband sheet polarizer can be used as an antireflection mean. Pixel driver 10 controls each of the polarization direction rotating elements.

The backlight structure produces unpolarized light composed of spectral components having both a-type and b-type polarization states. The RI-Polar and FI-Polar are multilayer structures of stacked layers, which reflect light consisting of spectral components having wavelengths at least within said visible band and said polarization state of b-type, and transmit polarized light consisting of spectral components having wavelengths at least within said visible band and said polarization state of a-type. The rear broadband sheet polarizer 4 and front broadband sheet polarizer 7 absorb light consisting of spectral components having wavelengths at least within said visible band and said polarization state of b-type, and transmit polarized light consisting of spectral components having wavelengths at least within said visible band and said polarization state of a-type.

At least one layer of each multilayer structure is optically anisotropic, and is made by means of Cascade Crystallization Process.

Figure 2A:
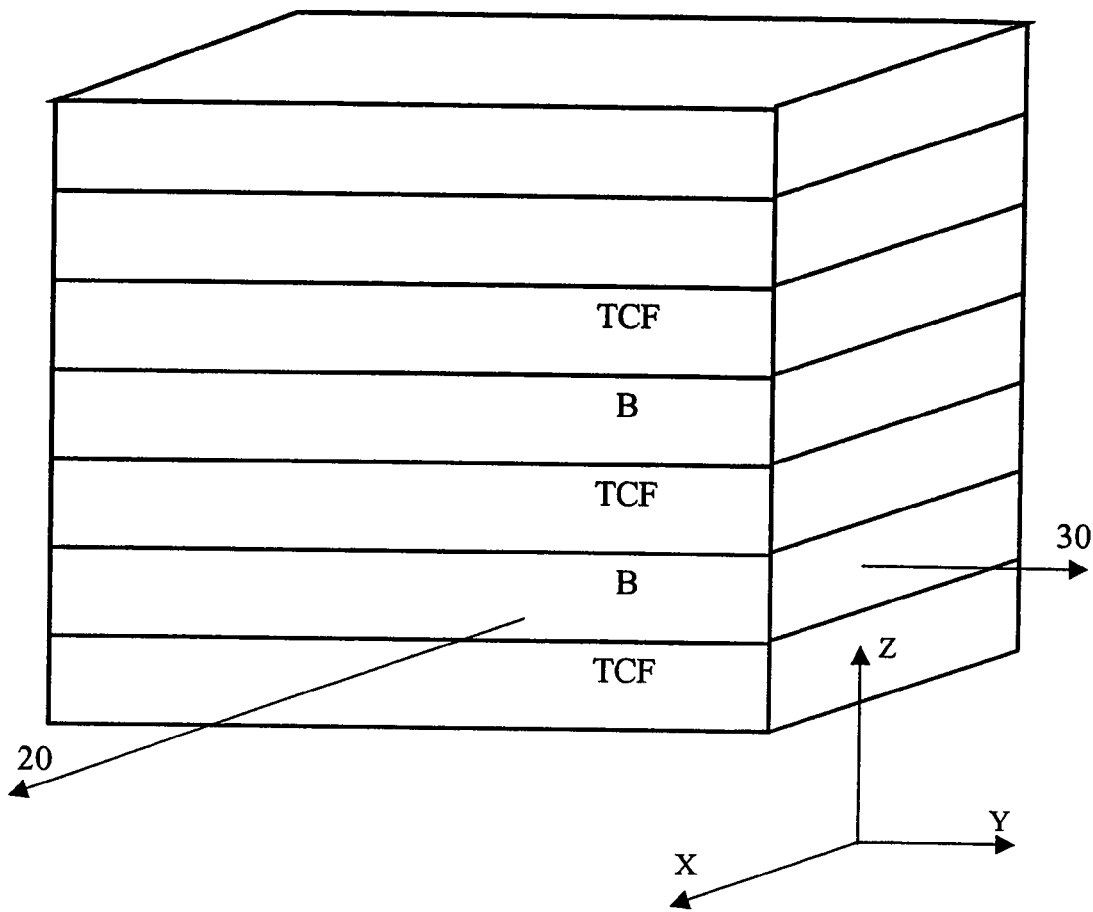
FIG. 2a shows the cross section of a multilayer structure comprising a stack of layers.

FIG. 2a is a schematic diagram of the cross section of one of the multilayer structure of stacked layers. This figure shows a coordinate system that defines X, Y and Z directions. The illustrated multilayer structure comprises alternating layers of two different polycyclic organic materials referred to as anisotropic layer A (also called as thin crystal film, TCF) and isotropic layer B throughout the drawings and description. Anisotropic TCF can be obtained by the method called Cascade Crystallization Process developed by Optiva, Inc. [P. Lazarev and M. Paukshto, Proceedings of the 7th International Workshop "Displays, Materials and Components" (Kobe, Japan, Nov. 29-Dec. 1, 2000), pp. 1159-1160].]. According to this method, an organic compound dissolved in an appropriate solvent forms a colloidal system (lyotropic liquid crystal solution) in which molecules are aggregated into supramolecules constituting kinetic units of the system. This liquid crystal phase is essentially a precursor of the ordered state of the system, from which a solid anisotropic crystal layer (also called as thin crystal film, TCF) is formed in the course of subsequent alignment of supramolecules and removal of the solvent.

A method stipulated for the synthesis of anisotropic thin crystal films from a colloidal system with supramolecules includes the following stages:

(i) application of the aforementioned colloidal system onto a substrate (or onto a device or a layer in a multilayer structure); the colloidal system must possess thixotropic properties, which are provided by maintaining a preset temperature and a certain concentration of the dispersed phase;

(ii) conversion of the applied colloidal system into a high flow (reduced viscosity) state by any external action (heating, shear straining, etc.) decreasing viscosity of the solution; this action can be either applied during the whole subsequent alignment stage or last for a minimum necessary time, so that the system would not relax into a state with increased viscosity during the alignment stage;

(iii) external alignment action upon the system, which can be produced using mechanical factors or by any other means; the degree of the external action must be sufficient for the kinetic units of the colloidal system to acquire the necessary orientation and form a structure that would serve as a base of the crystal lattice of the anisotropic thin crystal film;

(iv) conversion of the aligned region of the layer from the state of reduced viscosity, achieved due to the external action, into the state of the initial or higher viscosity; this transition is performed so as not to cause disorientation of the anisotropic thin crystal film structure and not to produce surface defects;

(v) final stage of solvent removal (drying), in the course of which the final anisotropic thin crystal film structure is formed.

In the resulting anisotropic layer, the molecular planes are parallel to each other and the molecules form a three-dimensional crystal structure, at least in a part of the layer. Optimization of the production technology may allow the formation of a single-crystal film.

The anisotropic layer thickness usually does not exceed 1 μm. The layer thickness can be controlled by changing the content of a solid substance in the applied solution and/or by varying the applied layer thickness. In order to obtain the layers possessing desired optical characteristics, it is possible to use mixed colloidal systems (such mixtures can form joint supramolecules).

The mixing of said organic compounds in solution results in the formation of mixed aggregates of variable composition. The analysis of X-ray diffraction patterns of dye mixtures allows us to judge about the molecular packing in supramolecules by the presence of a characteristic diffraction peak corresponding to intermolecular distances in the range from 3.1 to 3.7 Å. In the general case, this value is common for aromatic compounds in the form of crystals and aggregates. The peak intensity and sharpness increase in the course of drying, but the peak position remains unchanged. This diffraction peak corresponds to the intermolecular spacing within aggregates (stacks) and has been observed in the X-ray diffraction patterns of various materials. The mixing is favored by the planar structure of molecules (or their fragments) and by the coincidence of one molecular dimension in the organic compounds under consideration. In the applied aqueous layer, the organic molecules possess a long-range order in one direction, which is related to the alignment of supramolecules on the substrate surface. As the solvent is evaporated, it is energetically favorable for the molecules to form a three-dimensional biaxial crystal structure. The chemical compound that can be used for this purpose are not limited to those listed above.

The anisotropic layers possess a high degree of optical anisotropy as well. Such layers exhibit the properties of E-type polarizers, which are related to peculiarities of the optical absorption of supramolecular complexes, and behave as retarders (phase-shifting films) in the spectral ranges where the absorption is insignificant. The retardation properties of these anisotropic layers are related to their birefringence (double refraction) that is, to a difference in refractive indices measured in the direction of application of the LLC solution onto a substrate and in the perpendicular direction. Layers formed from the LLC systems based on strong (light-fast) dye molecules are characterized by high thermal stability and radiation resistance. They remain stable in a temperature range of approximately 350-700° C.

There are other advantages of this technology. The thickness of the anisotropic thin crystal film can be controlled precisely through the content of the sold phase in the liquid crystal and the thickness of the wet layer during its application. Therefore the technology allows one to select the reflection indexes and the thickness of each layer and their combination to provide an interference extremum in at least one region of the spectrum for at least one polarization of incident light. The technology is a low-temperature process. This technology considerably simplifies process of fabrication of an interference polarizer. The process of polarizer fabrication can be integrated, for example, into process of fabrication of the display or another device. There are no limitations on compatibility of used polycyclic organic compounds.

Thus, optically anisotropic A layers are obtained by means of Cascade Crystallization Process. Such layers are characterized by a globally ordered biaxial crystalline structure with an intermolecular spacing of 3.4±0.3 Å in the direction of one of the optical axes. Each TCF is characterized by at least two indexes of refraction: nx and ny. These layers have a fundamental absorption edge below 400 nm, are uniformly transparent in the wavelength band of visible light, and have a transmission coefficient of not less than 0.98. Each TCF is formed by rodlike supramolecules, which represent at least one polycyclic organic compound with a conjugated π-system and ionogenic groups.

The X-axis is referred to below as the "alignment" direction while the Y-axis is referred to as the "transverse" direction.

Layers B are isotropic and have a nominal index of refraction (for example, n=1.64), which is not substantially altered by Cascade Crystallization Process.

Cascade Crystallization Process alters the index of refraction of TCFs representing layers A. TCFs have one index of refraction (for example, n=1.64) associated with the alignment direction and a different index of refraction (for example, n=1.88) associated with the transverse direction. By definition, the index of refraction associated with an in-plane axis (an axis parallel to the surface of the film) is called the "effective" index of refraction for the plane-polarized incident light whose plane of polarization is parallel to this axis.

Thus, the multilayer stack (TCF-B-TCF-B-TCF . . . ) has a large difference of refractive indices between layers ($\Delta n=1.88-1.64=0.24$) associated with the transverse direction. In the alignment direction, the indices of refraction of various layers are essentially the same ($\Delta n=1.64-1.64=0$). These optical characteristics allow the multilayer structures to transmit the polarization component of the incident light that is correctly oriented with respect to the "transmission" axis (30) parallel to Y-axis and shown in FIG. 2a. In the surveyed embodiment this transmission axis coincides with the alignment direction. The light emerging from I-Polar (1) is referred to as having the first polarization orientation (a).

The light not transmitted through interference polar (I-Polar) (1) has the polarization orientation (b) that differs from the first orientation (a). Light having the polarization orientation (b) will encounter the index differences, which results in reflection of this light. Thus, the transverse direction defines so-called "extinction" axis (20) parallel to X-axis and shown in FIG. 2a. In this manner, I-Polar (1) transmits light having the selected first polarization (a) and reflects light having the second polarization (b).

Figure 2B:
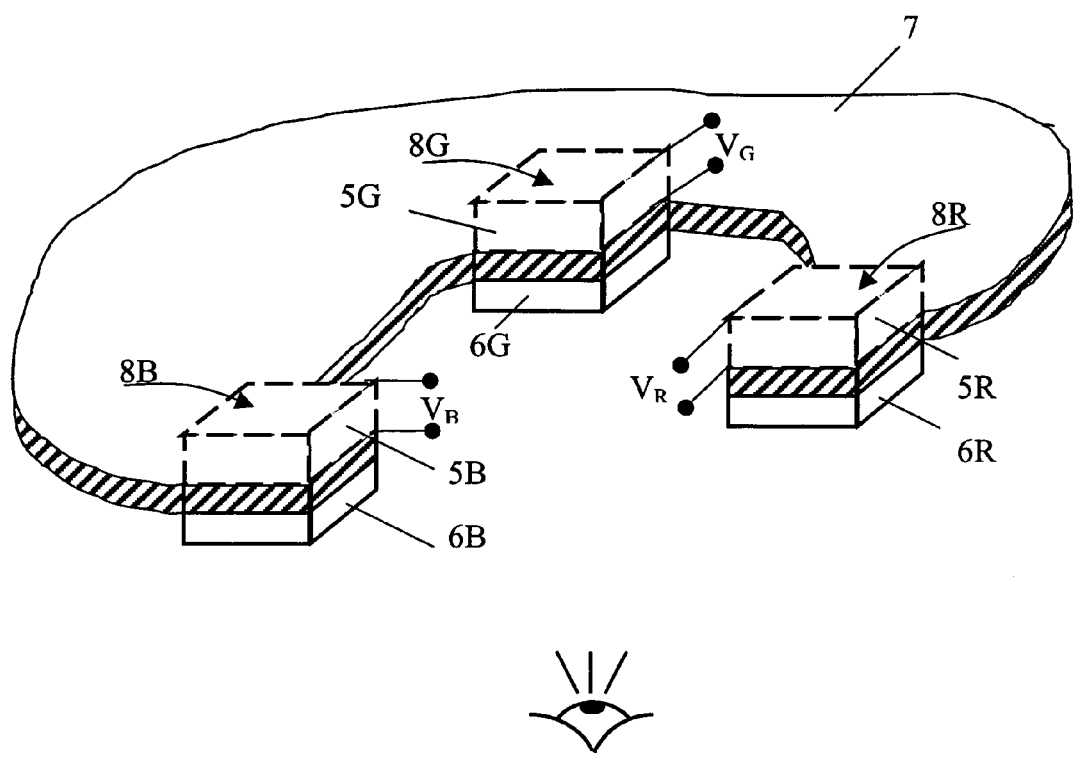
FIG. 2b presents a portion of the LCD panel according to FIG. 1, showing the electronically controlled polarization rotating elements associated with pixel structures thereof.

In order to produce high-resolution color images, the spatial period of the pixelated arrays 6 is selected to be relatively small as compared to the overall length and height dimensions of the LCD panel. In one embodiment of the present invention, each pixel structure 9 in the LCD panel is comprised of "red" subpixel 8R, "green" subpixel 8G and "blue" subpixel 8B as illustrated in FIG. 2b. As shown therein, each "red" subpixel structure 8R comprises a "red"-band color filter 6R adjacent to the first polarization direction rotating element 5R, which is a part of a continuous liquid crystal layer. Each "green" subpixel structure 8G comprises a "green"-band color filter 6G adjacent to the second polarization direction rotating element 5G, which is a part of a continuous liquid crystal layer. Each "blue" subpixel element 8B comprises a "blue"-band color filter 6B adjacent to the third polarization direction rotating element 5B, which is a part of a continuous liquid crystal layer. The output intensity (i.e., brightness or darkness level) of each "red" subpixel structure is controlled by applying a pulse-width modulated voltage signal $V_R$ to electrodes of the electrically controlled spatially polarization direction rotating element 5R. The output intensity of each "green" subpixel structure is controlled by applying a pulse-width modulated voltage signal $V_G$ to electrodes of the electrically controlled polarization direction rotating element 5G. The output intensity of each "blue" subpixel structure is controlled by applying a pulse-width modulated voltage signal $V_B$ to electrodes of the electrically controlled polarization direction rotating element 5B. By simply varying the pulse widths of voltages $V_R$, $V_G$, $V_B$, the gray-scale intensity (i.e. brightness) level of each subpixel structure can be controlled in a manner well known in the LCD panel art.

In one embodiment of the LCD panel construction shown in FIG. 1, spectral filtering is performed after spatial intensity modulation. In the illustrative embodiment of this LCD panel construction shown in FIGS. 3 and 4, linear polarization techniques are used to carry out the spatial intensity modulation and spectral filtering functions employed therein.

Figure 3:
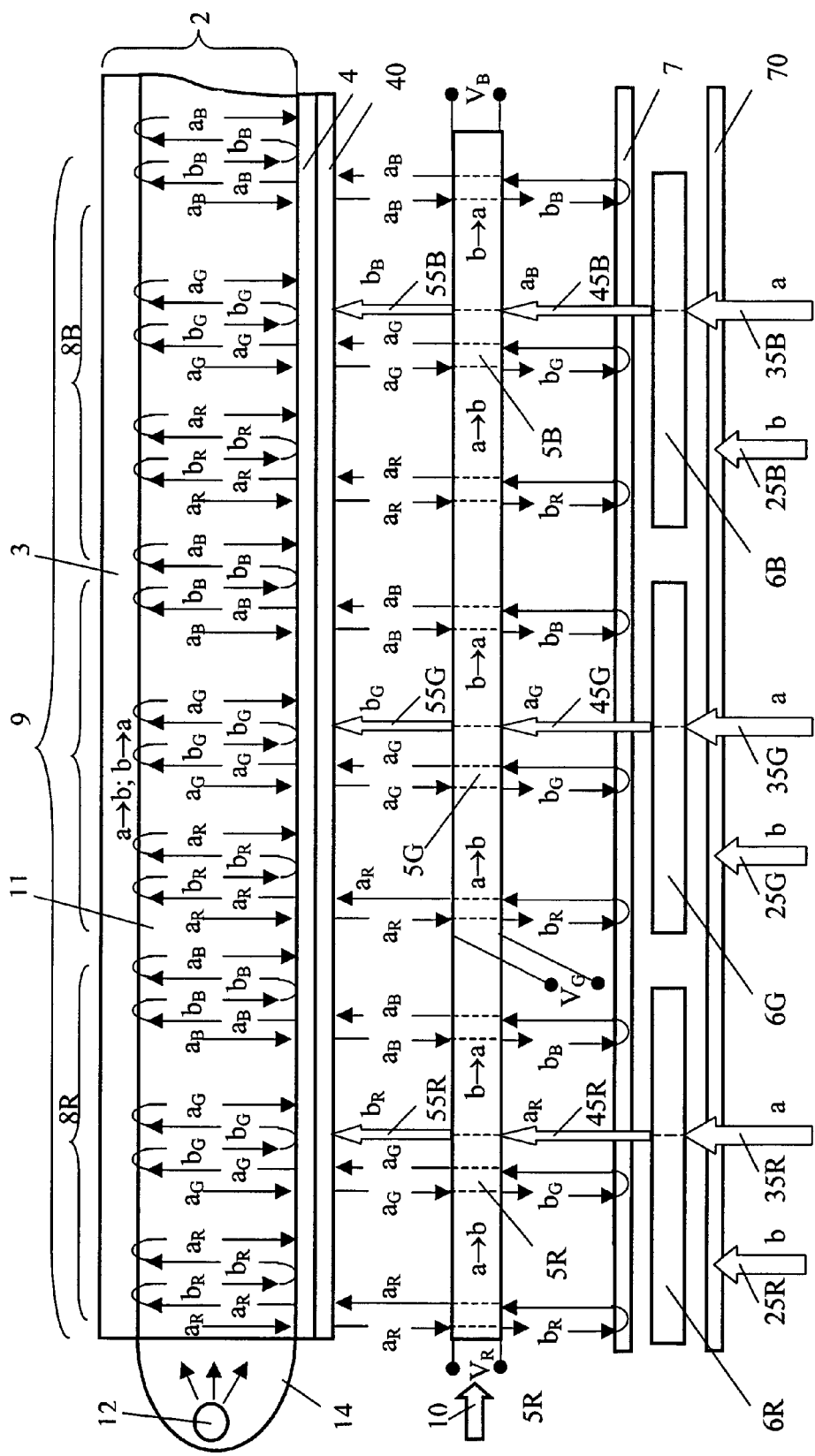
FIG. 3 is a schematic diagram of an expanded cross-sectional view of an exemplary pixel structure within the first particular embodiment of the LCD panel shown in FIG. 1, wherein the spatial intensity modulation elements of the LCD panel are realized using linear polarization rotating elements, and the pixel driver signals provided thereto are selected to produce "dark" output levels at each of the RGB (red, green, blue) subpixels of the exemplary pixel structure.
Figure 4:
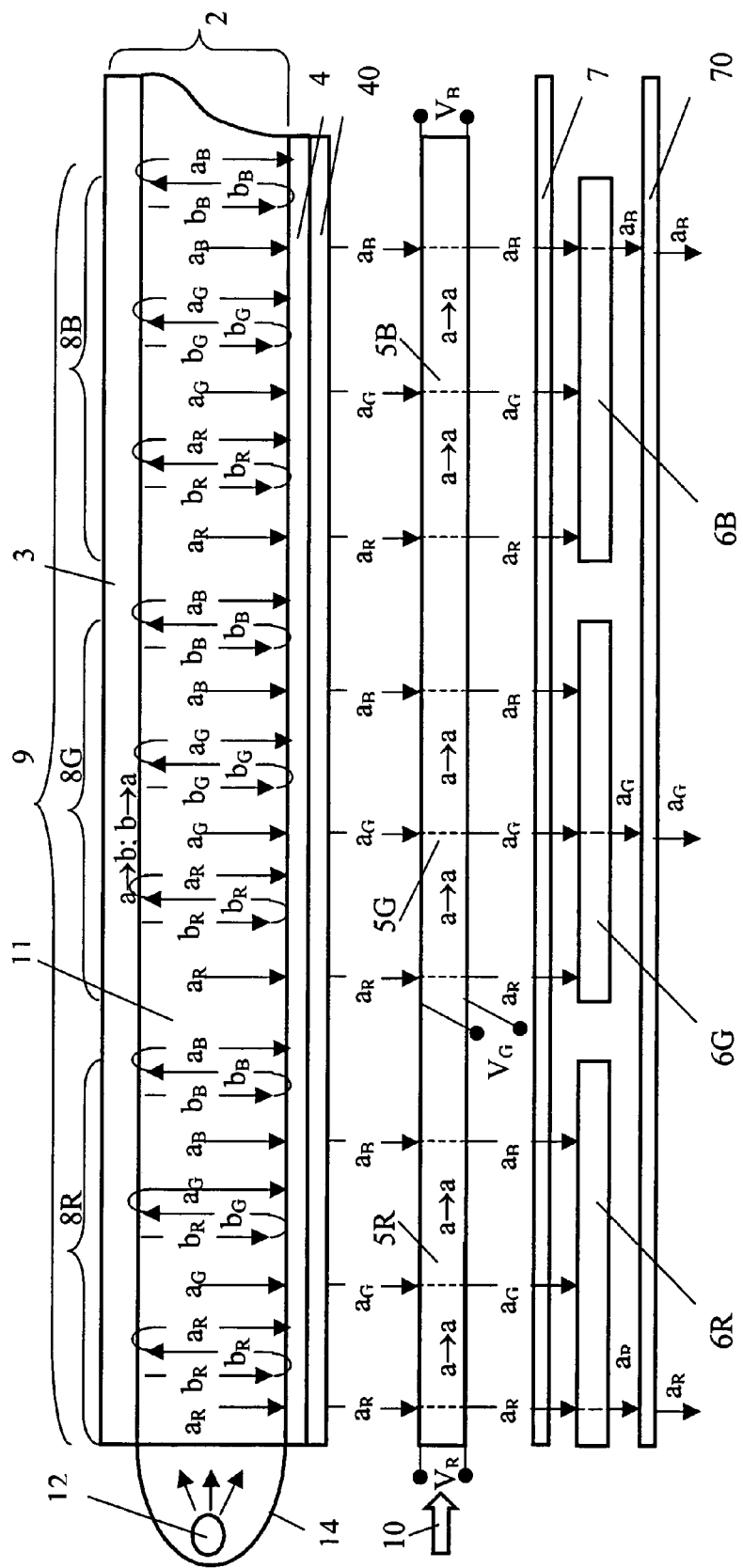
FIG. 4 is a schematic diagram of an expanded cross-sectional view of an exemplary pixel structure within the first particular embodiment of the LCD panel shown in FIG. 1, wherein the spatial intensity modulation elements of the LCD panel are realized using linear polarization rotating elements, and the pixel driver signals provided thereto are selected to produce "bright" output levels at each of the RGB subpixels of the exemplary pixel structure.

In the embodiments shown in FIGS. 3 and 4, the backlight structure 2 comprises a quasi-diffusive reflector 3, a light guiding panel 11, a pair of edge-illuminating light sources 12 and 13 (the latter is not shown in FIGS. 3 and 4, see this element in FIG. 1), and a pair of focusing mirrors 14 and 15 (see FIG. 1), respectively, for coupling the light fluxes produced by sources 12 and 13 into the edges of light guiding panel 11. Preferably, the light guiding panel 11 is made of an optically transparent material. A pair of miniature fluorescent tubes emitting unpolarized light serve as light sources 12 and 13.

During backlight operation, the light flux produced by light sources 12 and 13 is coupled with the aid of focusing mirrors 14 and 15 into the edges of the light guiding panel 11, in which the light exhibits total internal reflection in a conventional manner. In this embodiment, the front surface of the light guiding panel 11 bears very fine pits in order to break the conditions of total internal reflection at the interface and allow the light to leak out in the direction of the array of polarization direction rotating elements. There are many alternative techniques for producing a plane of unpolarized light, which can also be used in the construction of any particular embodiment of the LCD panel according to the present invention.

For purposes of illustration only, the spectral filtering function realized within LCD panel of the first embodiments is based on the RGB (red, green, blue) additive primary color system. Alternatively, however, the spectral filtering function within LCD panel may be based on the CMY (cyan, magenta, yellow) subtractive primary color system.

In the first illustrative embodiment of the LCD panel, the emission spectrum of the light source within the backlight panel is assumed to be "white", and the spectral filtering function of the LCD panel is based on the RGB (red, green, blue) color system. Thus, each of the color filters 6R, 6G, and 6B is designed to have pass-band characteristics such that all of the spectral content of the "red", "green" and "blue" bands of the light source, respectively, is used to produce color images for display. In this embodiment, each color filter 6R, 6G and 6B is realized as a "pass-band" interference color filter.

In the first embodiment shown in FIGS. 3 and 4, the broadband rear interference polar (RI-Polar) 4 transmits light having polarization state of a-type, reflects light having polarization state of b-type and serves as a polarization reference. Similarly, a broadband front interference polar (FI-Polar) 7 transmits light having polarization state of a-type, reflects light having polarization state of b-type. The reflection characteristics of the broadband rear interference polar (RI-Polar)

Figure 5A:
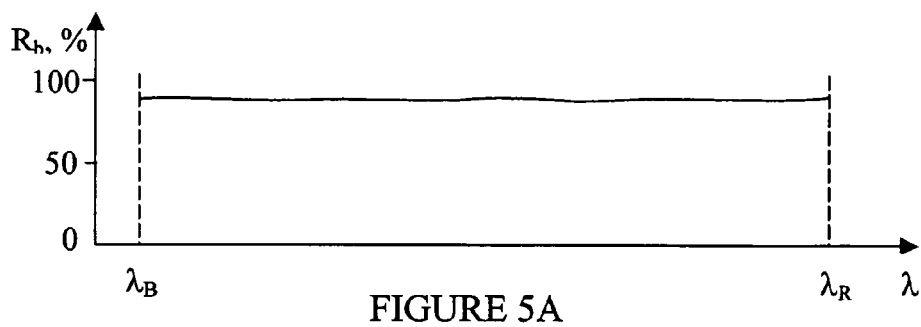
FIG. 5A is a schematic diagram illustrating the reflection characteristics of the broadband rear interference polar (RI-Polar) of the LCD panel shown in FIGS. 3 and 4.
Figure 5B:
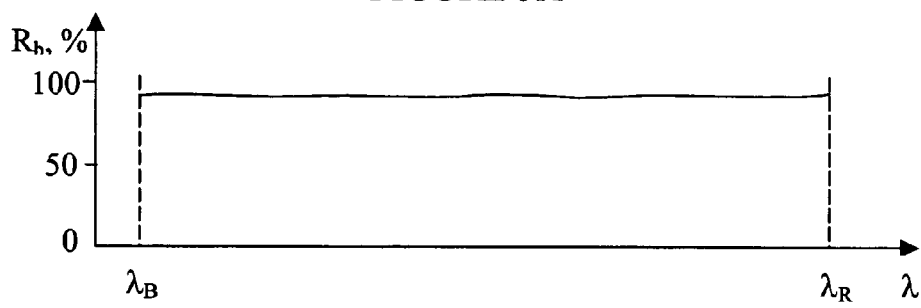
FIG. 5B a schematic diagram illustrating the reflection characteristics of the broadband front interference polar (FI-Polar) of the LCD panel shown in FIGS. 3 and 4.

4 are graphically illustrated in FIG. 5A for incident light having linear polarization state of b-type, and the reflection characteristics of the broadband front interference polar (FI-Polar) 7 are graphically illustrated in FIG. 5B for incident light having linear polarization state of b-type. For incident light having orthogonal linear polarization state of a-type, the broadband transmission characteristics for these panels (4 and 7) are substantially uniform for all wavelengths within the visible spectral range.

In the first illustrative embodiment shown in FIGS. 3 and 4, the array of polarization direction rotating elements 5 is realized as an array of electronically-controlled elements rotating the electric field linearly polarized according to a-type to the polarization state of b-type, and vice versa, as the light is transmitted through the corresponding pixels in the LCD panel. Each of the said polarization direction rotating elements is a part (area) of a continuous liquid crystal layer. In the first illustrative embodiment shown in FIGS. 3 and 4, each electronically-controlled linear polarization direction rotating element can be realized as a part of twisted nematic (TN) liquid crystal layer with twist angle equal to 90°, whose operation is controlled by applied voltage (by pixel drivers 10) as is well known in the art. Such electrically controlled part of a liquid crystal layer will be named as a linear polarization direction rotating element. In the construction of the linear polarization direction rotating elements, thin film transistors (TFTs) can be used to create a voltage drop across a layer of liquid crystal material necessary to achieve alignment of the liquid crystal molecules and thus cause the corresponding element not to rotate the polarization direction of transmitted light. In the electrically inactive state (i.e., for zero applied voltage), the electric field intensity of the light at the cell output is substantially zero and thus a "dark" subpixel level is produced (see FIG. 3). In the electrically active state (i.e., when a threshold voltage VT is applied), the electric field intensity of light at the cell output is substantially nonzero and thus a "bright" subpixel level is produced (see FIG. 4).

In the first illustrative embodiment shown in FIGS. 3 and 4 the pixelated array of color filters 6 is realized as an array of pass-band elements formed within a single plane. Broadband front interference polar (FI-Polar) 7 is laminated on the pixelated array of color filters 6. As shown in FIGS. 3 and 4, each pass-band element in the pixelated pass-band panel 6 transmits the light in a narrow wavelength band appropriate to a pass-band of the subpixel and absorbs a light outside of indicated wavelength band, at the same time the broadband front interference polar (FI-Polar) 7 transmits the light having the polarization state of a-type and reflects the light having the polarization state of b-type in a broad wavelength band.

Figure 5C:
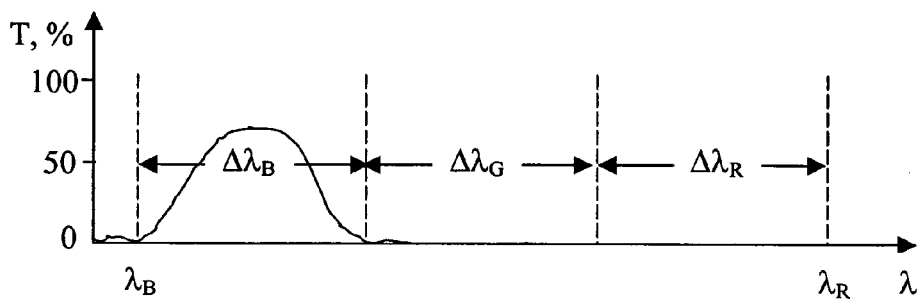
FIG. 5C is a schematic diagram illustrating the transmittance characteristics of the color filters associated with each "blue" subpixel region of the LCD panel shown in FIGS. 3 and 4.

As shown in FIG. 5C, each pass-band color filter associated with a "blue" subpixel in the pixelated array of color filters 6 is particularly designed to absorb nearly 100% of all spectral components having the wavelengths within the "green" band $\Delta\lambda G$ or the "red" band $\Delta\lambda R$, whereas nearly 70% of all spectral components having the wavelengths within the "blue" band $\Delta\lambda B$ are transmitted through the pass-band color filter.

Figure 5D:
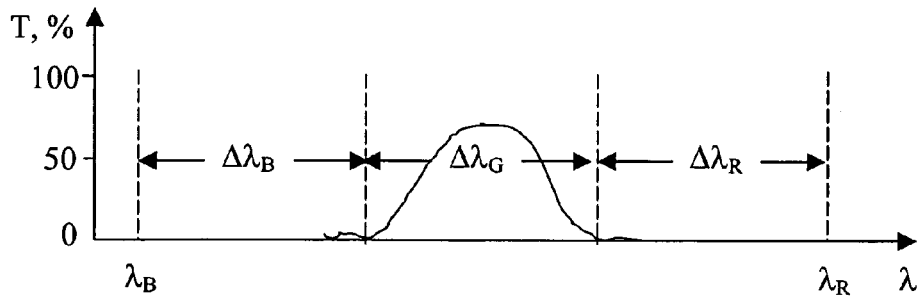
FIG. 5D is a schematic diagram illustrating the transmittance characteristics of the color filters associated with each "green" subpixel region of the LCD panel shown in FIGS. 3 and 4.

As shown in FIG. 5D, each pass-band color filter associated with a "green" subpixel in the pixelated array of interference color filters 6 is particularly designed to absorb nearly 100% all spectral components having the wavelengths within the "red" band $\Delta\lambda R$ or the "blue" band $\Delta\lambda B$, whereas nearly 70% of all spectral components having the wavelengths within the "green" band $\Delta\lambda G$ are transmitted through the pass-band color filter.

Figure 5E:
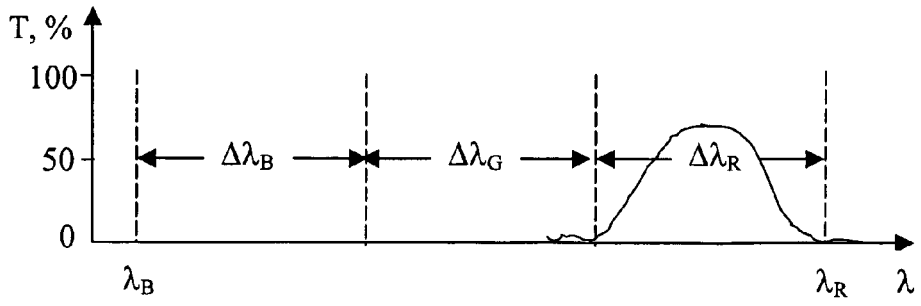
FIG. 5E is a schematic diagram illustrating the transmittance characteristics of the color filters associated with each "red" subpixel region of the LCD panel shown in FIGS. 3 and 4.

As shown in FIG. 5E, each pass-band color filter associated with a "red" subpixel in the pixelated array of color filters 6 is particularly designed to absorb nearly 100% all spectral components having the wavelengths within the "green" band $\Delta\lambda G$ or the "blue" band $\Delta\lambda B$, whereas nearly 70% of all spectral components having the wavelengths within the "red" band $\Delta\lambda R$ are transmitted through the pass-band color filter.

The LCD panel according to the present invention employs a light-recycling scheme. This scheme is implemented in the disclosed LCD panel in order to avoid high energy losses associated with prior art LCD panel design, and thereby more fully utilize the light energy produced by the backlight structure. While the details of this light-recycling scheme will be hereinafter described for each of the illustrative embodiments, it will be expedient in this context to briefly outline the general principles of light recycling.

The light-recycling scheme is schematically illustrated in FIGS. 3 and 4, and will be described in greater detail hereinafter. By virtue of this light-recycling scheme of the present invention, it is now possible to design LCD panels capable of utilizing with a high efficiency the light produced by backlight sources, in marked contrast with prior art LCD panels having maximum efficiencies of about 5%. The feature of the present invention is the saving of light in a "dark" state of the liquid crystal display.

As is shown in FIGS. 3 and 4, unpolarized light produced within the backlight structure is composed of spectral components having both a-type and b-type polarization states. Only spectral components in polarization state of a-type are transmitted through the broadband rear interference polar (RI-Polar) 4 adjacent to the backlight panel 2, whereas spectral components in polarization state of b-type incident thereon are reflected without energy loss or absorption. Spectral components reflected from broadband rear interference polar (RI-Polar) 4 are incident onto the quasi-diffusive reflector 3 and undergo polarization inversion (from a-type to b-type and vice versa). This reflection process is independent of the wavelength. The spectral components having the polarization inverted from b-type to a-type are now transmitted through the broadband rear interference polar (RI-Polar) 4. Then, the light transmitted the broadband rear interference polar then incidents onto rear broadband sheet polarizer 40, where the light consisting of spectral components having wavelengths within visible band and polarization state of b-type is absorbed and the light consisting of spectral components having wavelengths within said visible band and said polarization state of a-type is transmitted.

When the linear polarization direction rotating elements 6R, 6G, and 6B associated with "red", "green", and "blue" subpixels (8R, 8G and 8B) are driven into inactive state as shown in FIG. 3, the spectral components of transmitted light are modified due to the orthogonal conversion of polarization state (from a-type to b-type and vice versa) and a "dark" subpixel level is produced in response to the inactive state into which the given element was driven.

When "red" subpixel 8R is driven into its "dark" state shown in FIG. 3, spectral components of the backlight radiation having wavelengths within the "red", "green", and "blue" band ($\Delta\lambda R$, $\Delta\lambda G$ or $\Delta\lambda B$) and the polarization state of a-type are transmitted through the broadband rear interference polar (RI-Polar) 4 and rear broadband sheet polarizer 40. Whereupon said spectral components are transmitted through the polarization direction rotating element 5R changing the polarization state from a-type to b-type. Then, the converted spectral components having polarization state of b-type reflected from the broadband front interference polar (FI-Polar) 7 without absorption. The reflected "red", "green", and "blue" spectral components ($\Delta\lambda R$, $\Delta\lambda G$ and $\Delta\lambda B$) having polarization state of b-type are retransmitted through the polarization direction rotating element 5R changing the polarization from b-type to a-type. Finally, the converted spectral components having polarization state of a-type are transmitted through the rear broadband sheet polarizer 40 and the broadband rear interference polar (RI-Polar) 4 back to the backlight structure for recycling. The ambient "white" light having polarization state of b-type (see arrow 25R in FIG. 3) is absorbed by front broadband sheet polatizer 70. On the other hand the ambient "white" light having polarization state of a-type (see arrow 35R in FIG. 3) is transmitted by front broadband sheet polatizer 70. Then, the part of light having the "red" spectral components is transmitted through the color filter 6R, whereas the part of light having the "green" or "blue" spectral components is absorbed by said color filter. Whereupon the "red" spectral components (see arrow 45R) are transmitted through the polarization direction rotating element 5R changing the polarization state from a-type to b-type. Then, the rear broadband sheet polarizer 40 absorbs the converted <<red>> spectral components (see arrow 55R).

When a "green" subpixel 8G is driven into its "dark" state shown in FIG. 3, spectral components of the backlight radiation having wavelengths within the "red", "green", or "blue" band ($\Delta\lambda R$, $\Delta\lambda G$ or $\Delta\lambda B$) and the polarization of a-type are transmitted through the broadband rear interference polar (RI-Polar) 4 and the rear broadband sheet polarizer 40. Whereupon said spectral components are transmitted through the polarization direction rotating element 5G changing the polarization state from a-type to b-type. Then, converted spectral components having polarization state of b-type are reflected from the broadband front interference polar (FI-Polar) 7 without absorption. The reflected "red", "green", and "blue" spectral components ($\Delta\lambda R$, $\Delta\lambda G$ and $\Delta\lambda B$) having polarization state of b-type are retransmitted through the polarization direction rotating element 5G changing the polarization state from b-type to a-type. Finally, the converted spectral components having polarization state of a-type are transmitted through the rear broadband sheet polarizer 40 and the broadband rear interference polar (RI-Polar) 4 back to the backlight structure for recycling. The ambient "white" light having polarization state of b-type (see arrow 25G in FIG. 3) is absorbed by front broadband sheet polatizer 70. On the other hand the ambient "white" light having polarization state of a-type (see arrow 35G in FIG. 3) is transmitted by front broadband sheet polatizer 70. Then, the part of light having the "green" spectral components is transmitted through the color filter 6G, whereas the part of light having the "red" or "blue" spectral components is absorbed by said color filter. Whereupon the "green" spectral components (see arrow 45G) are transmitted through the polarization direction rotating element 5G changing the polarization state from a-type to b-type. Then, the rear broadband sheet polarizer 40 absorbs the converted <<green>> spectral components (see arrow 55G).

When a "blue" subpixel 8B is driven into its "dark" state shown in FIG. 3, spectral components of the backlight radiation having wavelengths within the "red", "green", or "blue" band ($\Delta\lambda R$, $\Delta\lambda G$ or $\Delta\lambda B$) and the polarization of a-type are transmitted through the broadband rear interference polar (RI-Polar) 4 and the rear broadband sheet polarizer 40. Whereupon said spectral components are transmitted through the polarization direction rotating element 5B changing the polarization state from a-type to b-type. Then, the converted spectral components having polarization state of b-type are reflected from the broadband front interference polar (FI-Polar) 7 without absorption. The reflected "red", "green", and "blue" spectral components ($\Delta\lambda R$, $\Delta\lambda G$ and $\Delta\lambda B$) having polarization state of b-type are retransmitted transmitted through the polarization direction rotating element 5B, changing the polarization state from b-type to a-type. Finally, the converted spectral components having polarization state of a-type are transmitted through the rear broadband sheet polarizer 40 and the broadband rear interference polar (RI-Polar) 4 back to the backlight structure for recycling. The ambient "white" light having polarization state of b-type (see arrow 25B in FIG. 3) is absorbed by front broadband sheet polatizer 70. On the other hand the ambient "white" light having polarization state of a-type (see arrow 35B in FIG. 3) is transmitted by front broadband sheet polatizer 70. Then, the part of light having the "blue" spectral components is transmitted through the color filter 6B, whereas the part of light having the "green" or "red" spectral components is absorbed by said color filter. Whereupon the "blue" spectral components (see arrow 45B) are transmitted through the polarization direction rotating element 5B changing the polarization state from a-type to b-type. Then, the rear broadband sheet polarizer 40 absorbs the converted <<blue>> spectral components (see arrow 55B).

When a linear polarization rotating element is driven to the active state as shown in FIG. 4, the element transmits the spectral components independently of the wavelength without effecting a conversion in polarization state, producing a "bright" subpixel level in response to the active state into which the given element was driven.

When a "red" subpixel 8R is driven to the "bright" state as shown in FIG. 4, spectral components of the backlight radiation having wavelengths within the "red" band $\Delta\lambda R$ and the polarization state of a-type are transmitted through the broadband rear interference polar (RI-Polar) 4 and the rear broadband sheet polarizer 40, the linear polarization direction rotating element 5R, the broadband front interference polar (FI-Polar) 7 without absorption, the "red" pass-band color filter 6R, and the front broadband sheet polarizer 70. In this state, spectral components of the backlight radiation having wavelengths within the "green" band $\Delta\lambda G$ or "blue" band $\Delta\lambda B$ and the polarization state of a-type are transmitted through the broadband rear interference polar (RI-Polar) 4, the rear broadband sheet polarizer 40, the linear polarization direction rotating element 5R and absorbed by the "red" pass-band color filter 6R.

When a "green" subpixel 8G is driven to its "bright" state as shown in FIG. 4, spectral components of the backlight radiation having wavelengths within the "green" band $\Delta\lambda G$ and a polarization state of a-type are transmitted through the broadband rear interference polar (RI-Polar) 4, the rear broadband sheet polarizer 40, the linear polarization direction rotating element 5G, the a broadband front interference polar (FI-Polar) 7 without absorption, the "green" pass-band color filter 6G and the front broadband sheet polarizer 70. In this state, spectral components of the backlight radiation having wavelengths within the "red" band $\Delta\lambda R$ or "blue" band $\Delta\lambda B$ and the polarization state of a-type are transmitted through the broadband rear interference polar (RI-Polar) 4, the rear broadband sheet polarizer 40, the linear polarization direction rotating element 5G, and absorbed by the "green" pass-band color filter 6G.

When a "blue" subpixel 8B is driven to its "bright" state as shown in FIG. 4, spectral components of the backlight radiation having wavelengths within the "blue" band $\Delta\lambda B$ and the polarization state of a-type are transmitted through the broadband rear interference polar (RI-Polar) 4, the rear broadband sheet polarizer 40, the linear polarization direction rotating element 5B, the broadband front interference polar (FI-Polar) 7 without absorption, the "blue" pass-band color filter 6B, and the front broadband sheet polarizer 70. In this state, spectral components of the backlight radiation having wavelengths within the "red" band $\Delta\lambda R$ or "green" band $\Delta\lambda G$ and the polarization state of a-type are transmitted through the broadband rear interference polar (RI-Polar) 4, the rear broadband sheet polarizer 40, the linear polarization direction rotating element 5B, and absorbed by the "blue" pass-band linearly polarizing interference color filter 6B.

In the second illustrative embodiment of the LCD panel (see FIGS. 6, 7, and 8), the emission spectrum of the light source within the backlight panel is also assumed to be "white", and the spectral filtering function of the LCD panel is based on the CMY (cyan, magenta, yellow) color system. Thus, each color filters 6C, 6M, and 6Y is designed to have one "absorb-band" and two "pass-band" characteristics so that all of the spectral content of the "cyan", "magenta" and "yellow" bands of the light source are used to produce color images for display. In this embodiment, each color filter 6C, 6M, and 6Y is realized as a color filter having one "absorb-band" and two "pass-band" characteristics.

Figure 6:
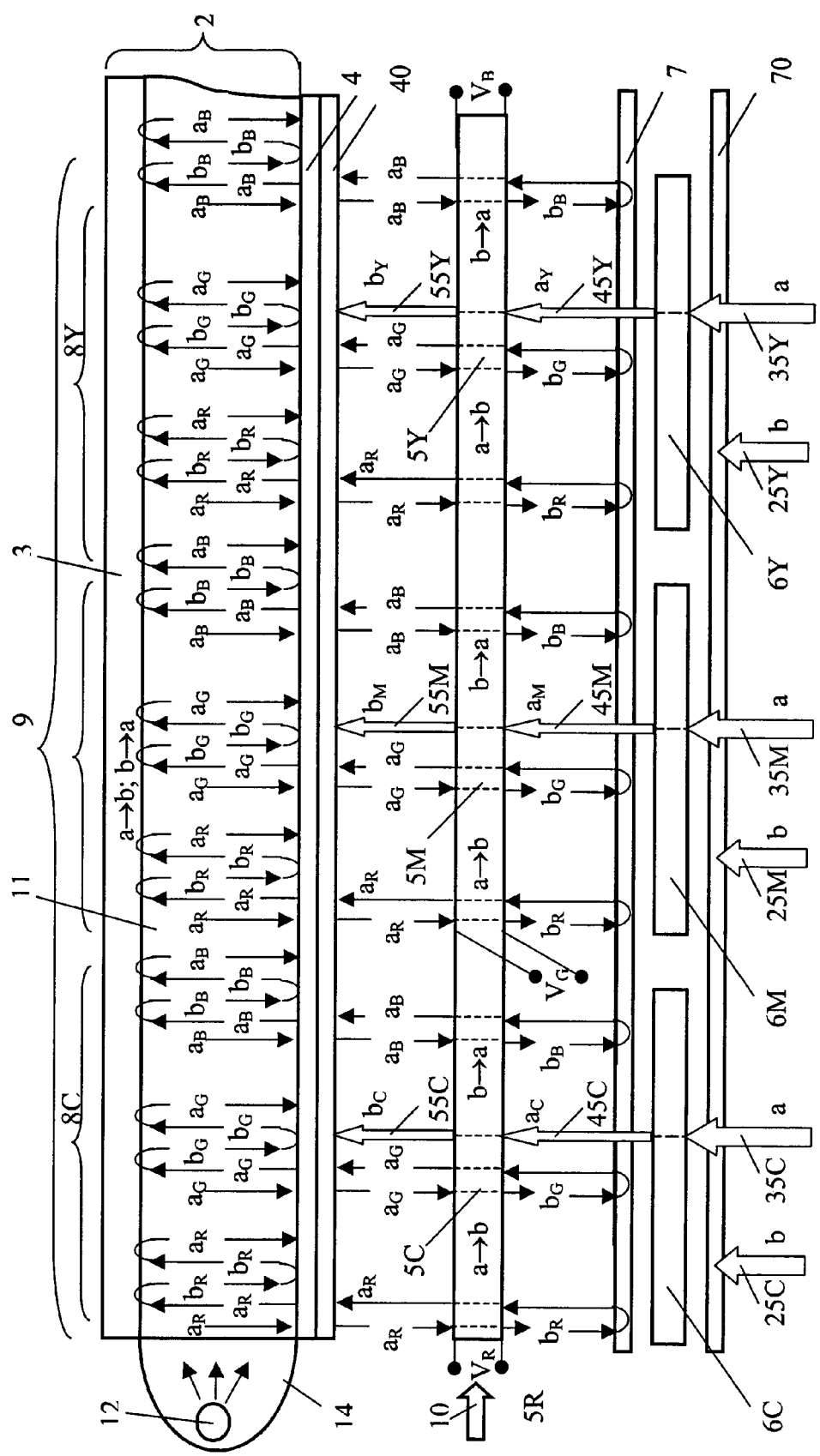
FIG. 6 is a schematic diagram of an expanded cross-sectional view of an exemplary pixel structure within the second particular embodiment of the LCD panel shown in FIG. 1, wherein the spatial intensity modulation elements of the LCD panel are realized using linear polarization rotating elements, and the pixel driver signals provided thereto are selected to produce "dark" output levels at each of the CMY (cyan, magenta, yellow) subpixels of the exemplary pixel structure.
Figure 7:
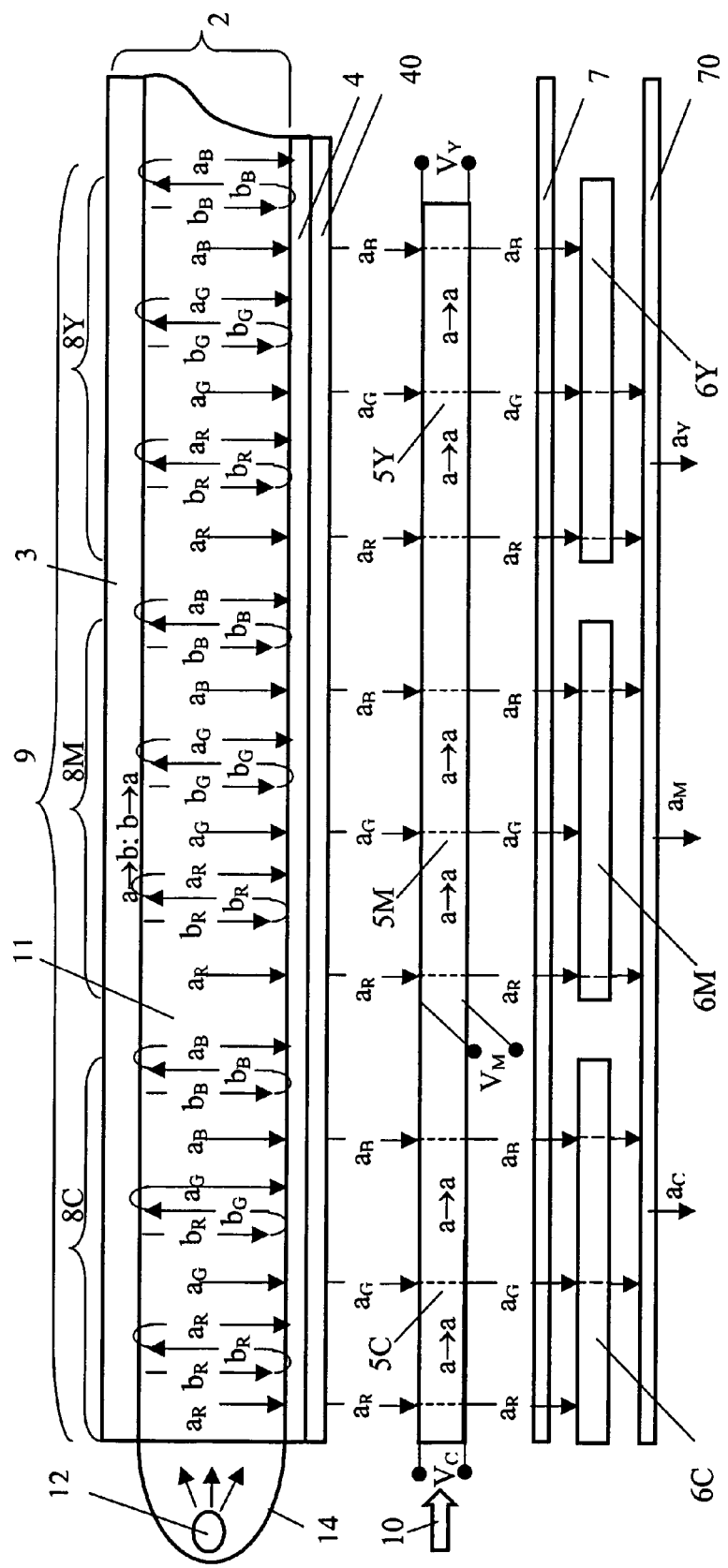
FIG. 7 is a schematic diagram of an expanded cross-sectional view of an exemplary pixel structure within the second particular embodiment of the LCD panel shown in FIG. 1, wherein the spatial intensity modulation elements of the LCD panel are realized using linear polarization rotating elements, and the pixel driver signals provided thereto are selected to produce "bright" output levels at each of the CMY subpixels of the exemplary pixel structure.

In the second embodiment shown in FIGS. 6 and 7, the broadband rear interference polar (RI-Polar) 4 transmits light having polarization state of a-type, reflects light having polarization state of b-type and serves as a polarization reference. Similarly, a broadband front interference polar (FI-Polar) 7 transmits light having polarization state of a-type, reflects light having polarization state of b-type. The reflection characteristics of the broadband rear interference polar (RI-Polar) 4 are graphically illustrated in FIG. 8A for incident light having linear polarization state of b-type, and the reflection characteristics of the a broadband front interference polar (FI-Polar) 7 are graphically illustrated in FIG. 8B for incident light having linear polarization state of b-type. For incident light having orthogonal linear polarization state of a-type, the broadband transmission characteristics for these interference polars (4 and 7) are substantially uniform for all wavelengths within the visible spectral range.

In the second illustrative embodiment shown in FIGS. 6 and 7, the array of polarization direction rotating elements 5 is realized as an array of electronically-controlled elements rotating the electric field linearly polarized according to a-type to the polarization state of b-type, and vice versa, as the light is transmitted through the corresponding pixels in the LCD panel. In the second illustrative embodiment shown in FIGS. 6 and 7, each electronically-controlled linear polarization direction rotating element can be realized as a twisted nematic (TN) liquid crystal cell with twist angle equal to 90°, whose operation is controlled by a control voltage well known in the art. To construct the linear polarization direction rotating elements, thin film transistors (TFTs) can be used to create the a voltages drop across a layer of liquid crystal material to achieve alignment of the liquid crystal molecules and thus cause the corresponding element to not rotate the polarization direction of transmitted light. In its electrically inactive state (i.e. no voltage is applied), the electric field intensity of the light exiting at the cell output is substantially zero and thus a "dark" subpixel level is produced (see FIG. 6). In its electrically active state (i.e. the threshold voltage VT is applied), the electric field intensity of light at the cell output is substantially nonzero and thus a "bright" subpixel level is produced (see FIG. 7).

In the second illustrative embodiment shown in FIGS. 6 and 7 the pixelated array of color filters 6 is realized as an array of absorb-band filters having two "pass-band" characteristics formed within a single plane. Broadband front interference polar (FI-Polar) 7 is laminated to the pixelated array of color filters 6. As shown in FIGS. 6 and 7, each absorb-band filter transmits the light having the spectral components in two waves lengths bands and absorb the light having the spectral components in a narrow wavelength band, at the same time the a broad-band front interference polar (FI-Polar) 7 transmits the light having the polarization state of a-type and reflects the light having the polarization state of b-type in a broad wavelength band.

Figure 8A:
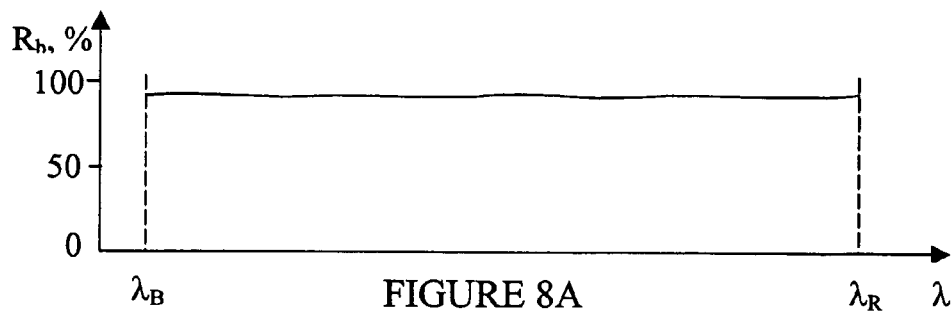
FIG. 8A is a schematic diagram illustrating the reflection characteristics of the broadband rear interference polar (RI-Polar) of the LCD panel shown in FIGS. 6 and 7.
Figure 8B:
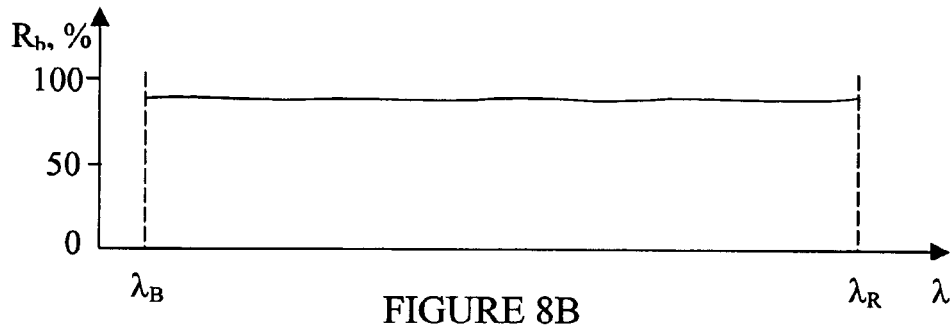
FIG. 8B is a schematic diagram illustrating the reflection characteristics of the broadband front interference polar (FI-Polar) of the LCD panel shown in FIGS. 6 and 7.
Figure 8C:
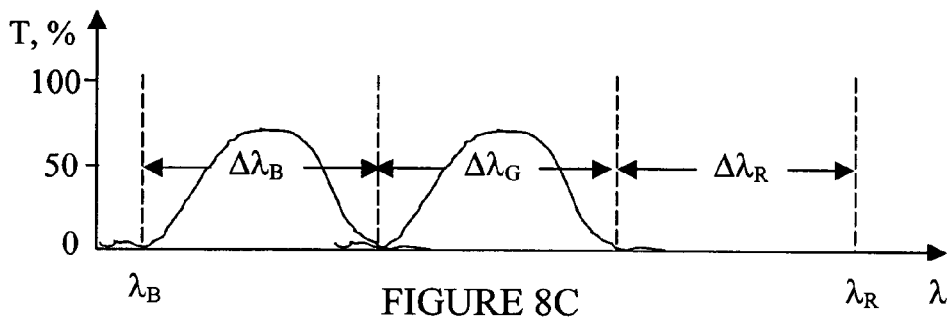
FIG. 8C is a schematic diagram illustrating the transmittance characteristics of the color filters associated with each "cyan" subpixel region of the LCD panel shown in FIGS. 6 and 7.

As shown in FIG. 8C, each absorb-band color filter associated with a "cyan" subpixel in the pixelated array of color filters 6 is particularly designed to transmit nearly 70% all spectral components having a wavelength within the "blue" band $\Delta\lambda B$ and the "green" band $\Delta\lambda G$, whereas all spectral components having a wavelength within the "red" band $\Delta\lambda R$ are absorbed nearly 100% through the absorb-band color filter.

Figure 8D:
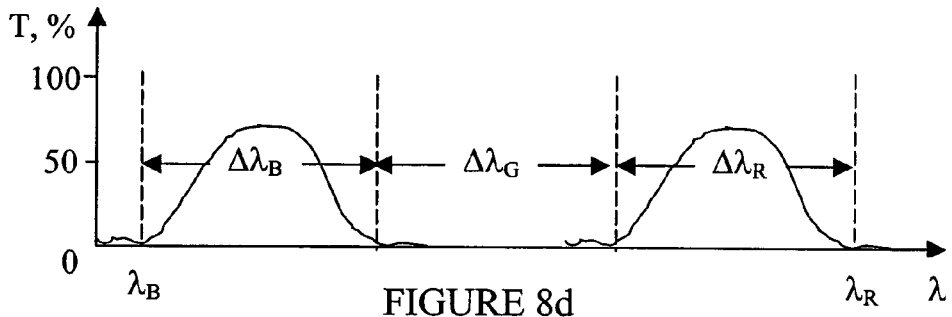
FIG. 8D is a schematic diagram illustrating the transmittance characteristics of the color filters associated with each "magenta" subpixel region of the LCD panel shown in FIGS. 6 and 7.

As shown in FIG. 8D, each absorb-band color filter associated with a "magenta" subpixel in the pixelated array of color filters 6 is particularly designed to transmit nearly 70% all spectral components having a wavelength within the "red" band $\Delta\lambda R$ and the "blue" band $\Delta\lambda B$, whereas all spectral components having a wavelength within the "green" band $\Delta\lambda G$ are absorbed nearly 100% through the absorb-band color filter.

Figure 8E:
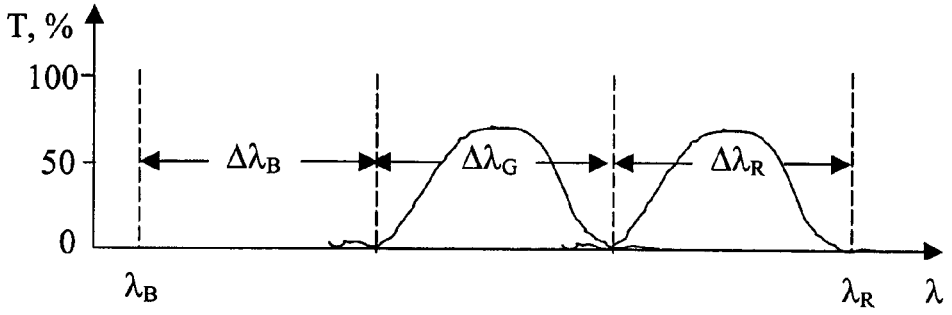
FIG. 8E is a schematic diagram illustrating the transmittance characteristics of the color filters associated with each "yellow" region subpixel of the LCD panel shown in FIGS. 6 and 7.

As shown in FIG. 8E, each absorb-band color filter associated with a "yellow." subpixel in the pixelated array of color filters 6 is particularly designed to transmit nearly 70% all spectral components having a wavelength within the "green" band $\Delta\lambda G$ and the "red" band $\Delta\lambda R$, whereas all spectral components having a wavelength within the "blue" band $\Delta\lambda B$ are absorbed nearly 100% through the absorb-band color filter.

The LCD panel of the present invention employs a light-recycling scheme which operates in the disclosed LCD panel in order to avoid the light energy losses associated with prior art LCD panel designs, and thereby more fully utilize of the light energy produced by the backlight structure.

In second embodiment of the present invention, a single polarization state of light is transmitted from the backlight structure to those structures (or subpanels) of the LCD panel where spatial intensity modulation and spectral filtering of the transmitted polarized light occurs in subpixels. The light-recycling scheme is schematically illustrated in FIGS. 6 and 7, and will be described in greater detail hereinafter. By virtue of this light recycling scheme of the present invention, it is now possible to design LCD panels capable of utilizing with a high efficiency the light produced by backlight sources, in marked contrast with prior art LCD panels having maximum efficiencies of about 5%.

As shown in FIGS. 6 and 7, unpolarized light produced within the backlight structure is composed of spectral components having both a-type and b-type polarization states. Only spectral components having the polarization state of a-type are transmitted through the broadband rear interference polar (RI-Polar) 4 adjacent the backlight panel 2, whereas spectral components having polarization state of b-type incident thereon are reflected without energy loss or absorption. Spectral components reflected from broadband rear interference polar (RI-Polar) 4 are incident onto the quasi-diffusive reflector 3 and undergo polarization inversion (a-type to b-type and vice versa). This reflection process is independent of the wavelength. The spectral components having the polarization inverted from b-type to a-type are now transmitted through the broadband rear interference polar (RI-Polar) 4.

When a linear polarization direction rotating elements 5C, 5M and 5Y associated with a "cyan", "magenta" or "yellow" subpixel (8C, 8M and 8Y) are driven into inactive state as shown in FIG. 6, the spectral components of transmitted light are modified due to the orthogonal conversion of polarization state (from a-type to b-type and vice versa) and a "dark" subpixel level is produced in response to the inactive state into which the given element was driven.

When a "cyan" subpixel 8C is driven into its "dark" state shown in FIG. 6, spectral components of the backlight radiation having wavelengths within the "red", "green" or "blue" band (ΔλR, ΔλG or ΔλB) and the polarization state of a-type are transmitted through the broadband rear interference polar (RI-Polar) 4 and the rear broadband sheet polarizer 40. Whereupon said spectral components are transmitted through the polarization direction rotating element 5C changing the polarization state from a-type to b-type. Then, the converted spectral components having polarization state of b-type are reflected off a broadband front interference polar (FI-Polar) 7 without absorption. The reflected "red", "green" and "blue" spectral components (ΔλR, ΔλG and ΔλB) having polarization state of b-type are retransmitted through the polarization direction rotating element 5C, changing the polarization state from b-type to a-type. Finally, the converted spectral components having polarization state of a-type are transmitted through the rear broadband sheet polarizer 40 and the broadband rear interference polar (RI-Polar) 4 back to the backlight structure for recycling. The ambient "white" light having polarization state of b-type (see arrow 25C in FIG. 6) is absorbed by front broadband sheet polatizer 70. On the other hand the ambient "white" light having polarization state of a-type (see arrow 35C in FIG. 6) is transmitted by front broadband sheet polatizer 70. Then, the part of light having the "cyan" spectral components is transmitted through the color filter 6C, whereas the part of light having the "magenta" or "yellow" spectral components is absorbed by said color filter. Whereupon the "cyan" spectral components (see arrow 45C) are transmitted through the polarization direction rotating element 5C changing the polarization state from a-type to b-type. Then, the rear broadband sheet polarizer 40 absorbs the converted <<cyan>> spectral components (see arrow 55C).

When a "magenta" subpixel 8M is driven into its "dark" state shown in FIG. 6, spectral components within the backlighting structure having wavelengths within the "red", "green" or "blue" band (ΔλR, ΔλG or ΔλB) and polarization state of a-type are transmitted through the broadband rear interference polar (RI-Polar) 4 and the rear broadband sheet polarizer 40. Whereupon said spectral components are transmitted through the polarization direction rotating element 5M changing the polarization state from a-type to b-type. Then, converted spectral components with polarization state of b-type are reflected from the broadband front interference polar (FI-Polar) 7 without absorption. The reflected "red", "green" and "blue" spectral components (ΔλR, ΔλG and ΔλB) having polarization state of b-type are retransmitted through the polarization direction rotating element 5M, changing the polarization state from b-type to a-type. Finally, the converted spectral components having polarization state of a-type are transmitted through the rear broadband sheet polarizer 40 and the broadband rear interference polar (RI-Polar) 4 back into the backlight structure for recycling. The ambient "white" light having polarization state of b-type (see arrow 25M in FIG. 6) is absorbed by front broadband sheet polatizer 70. On the other hand the ambient "white" light having polarization state of a-type (see arrow 35M in FIG. 6) is transmitted by front broadband sheet polatizer 70. Then, the part of light having the "magenta" spectral components is transmitted through the color filter 6M, whereas the part of light having the "cyan" or "yellow" spectral components is absorbed by said color filter. Whereupon the "magenta" spectral components (see arrow 45M) are transmitted through the polarization direction rotating element 5M changing the polarization state from a-type to b-type. Then, the rear broadband sheet polarizer 40 absorbs the converted "magenta" spectral components (see arrow 55M).

When a "yellow" subpixel 8Y is driven into its "dark" state shown in FIG. 6, spectral components within the backlight structure having wavelengths within the "red", "green" or "blue" band (ΔλR, ΔλG or ΔλB) and polarization state of a-type are transmitted through the broadband rear interference polar (RI-Polar) 4 and the rear broadband sheet polarizer 40. Whereupon said spectral components are transmitted through the polarization direction rotating element 5Y changing the polarization state from a-type to b-type. Then, converted spectral components having polarization state of b-type are reflected from the broadband front interference polar (FI-Polar) 7 without absorption. The reflected "red", "green" and "blue" spectral components (ΔλR, ΔλG and ΔλB) having polarization state of b-type are retransmitted through the polarization direction rotating element 5Y, changing the polarization state from b-type to a-type. Finally, the converted spectral components having polarization state of a-type are transmitted through the rear broadband sheet polarizer 40 and the broadband rear interference polar (RI-Polar) 4 back into the backlight structure for recycling. The ambient "white" light having polarization state of b-type (see arrow 25Y in FIG. 6) is absorbed by front broadband sheet polatizer 70. On the other hand the ambient "white" light having polarization state of a-type (see arrow 35Y in FIG. 6) is transmitted by front broadband sheet polatizer 70. Then, the part of light having the "yellow" spectral components is transmitted through the color filter 6Y, whereas the part of light having the "cyan" or "magenta" spectral components is absorbed by said color filter. Whereupon the "yellow" spectral components (see arrow 45Y) are transmitted through the polarization direction rotating element 5Y changing the polarization state from a-type to b-type. Then, the rear broadband sheet polarizer 40 absorbs the converted "yellow" spectral components (see arrow 55Y).

When a linear polarization rotating element is controlled to the active state as shown in FIG. 7, the element transmits the spectral components independently of wavelength without effecting a conversion in polarization state, producing a "bright" subpixel level in response to the active state into which the given element was driven.

When a "cyan" subpixel 8C is driven to the "bright" state as shown in FIG. 7, spectral components of the backlight radiation having wavelengths within the "red" band ΔλR and a polarization state of a-type are transmitted through the broadband rear interference polar (RI-Polar) 4, the rear broadband sheet polarizer 40, linear polarization direction rotating element 5C, a broadband front interference polar (FI-Polar) 7 without absorption and absorbed by the "cyan" absorb-band color filter 6C. In this state of subpixel 8C, spectral components within the backlight structure having wavelengths within the "green" band ΔλG or "blue" band ΔλB and a polarization state of a-type are transmitted through the broadband rear interference polar (RI-Polar) 4, the rear broadband sheet polarizer 40, the linear polarization direction rotating element 5C, the broadband front interference polar (FI-Polar) 7 without absorption, and the "cyan" absorb-band color filter 6C. The spectral components having wavelengths within the "green" band ΔλG and "blue" band ΔλB are mixed with each other at the output of color filter 6C and create the light of cyan color. Then the cyan light is transmitted through the front broadband sheet polarizer 70.

When a "magenta" subpixel 8M is driven to the "bright" state as shown in FIG. 7, spectral components of the backlight radiation having wavelengths within the "green" band ΔλG and a polarization state of a-type are transmitted through the broadband rear interference polar (RI-Polar) 4, the rear broadband sheet polarizer 40, the linear polarization direction rotating element 5M, a broadband front interference polar (FI-Polar) 7 without absorption and absorbed by the "magenta" absorb-band color filter 6M. In this state of subpixel 8M, spectral components within the backlight structure having wavelengths within the "red" band ΔλR or "blue" band ΔλB and a polarization state of a-type are transmitted through the broadband rear interference polar (RI-Polar) 4, the rear broadband sheet polarizer 40, the linear polarization direction rotating element 5M, the broadband front interference polar (FI-Polar) 7 without absorption, and the "magenta" absorb-band color filter 6M. The spectral components having wavelengths within the "red" band ΔλR and "blue" band ΔλB are mixed with each other at the output of color filter 6M and create the light of magenta color. Then the magenta light is transmitted through the front broadband sheet polarizer 70.

When a "yellow" subpixel 8Y is driven to the "bright" state as shown in FIG. 7, spectral components of the backlight radiation having wavelengths within the "blue" band ΔλB and a polarization state of a-type are transmitted through the broadband rear interference polar (RI-Polar) 4, the rear broadband sheet polarizer 40, the linear polarization direction rotating element 5Y a broadband front interference polar (FI-Polar) 7 without absorption and absorbed by the "yellow" absorb-band color filter 6Y. In this state of subpixel 8Y, spectral components within the backlight structure having wavelengths within the "red" band ΔλR or "green" band ΔλG and a polarization state of a-type are transmitted through the broadband rear interference polar (RI-Polar) 4, the rear broadband sheet polarizer 40, the linear polarization direction rotating element 5Y, the broadband front interference polar (FI-Polar) 7 without absorption, and the "yellow" absorb-band color filter 6Y. The spectral components having wavelengths within the "red" band ΔλR and "green" band ΔλG are mixed with each other at the output of color filter 6Y and create the light of yellow color. Then the yellow light is transmitted through the front broadband sheet polarizer 70.

DESCRIPTION OF EXEMPLARY EMBODIMENTS

One preferred embodiment of the disclosed invention is a liquid crystal display panel with improved image contrast comprising an array of pixel regions and a sequence of a recycling backlight structure comprising broadband rear interference polar (RI-Polar) having a transmission axis AB with preset orientation, a spatial intensity modulation structure comprising a broadband front interference polar (FI-Polar) having a transmission axis approximately parallel to the transmission axis AB, and a spectral filtering structure associated with each said pixel region. The RI-Polar and FI-Polar are multilayer structures of stacked layers. At least one layer of each multilayer structure is optically anisotropic and is made by means of Cascade Crystallization Process. Said layer is characterized by a globally ordered biaxial crystalline structure with an intermolecular spacing of 3.4±0.3 Å in the direction approximately parallel to the transmission axis AB. This layer is transparent in the wavelength band of visible light, and is formed by rodlike supramolecules which represent at least one polycyclic organic compound with a conjugated π-system and ionogenic groups. In one variant of the disclosed liquid crystal display panel the backlight structure further comprises a sequence of a light guide having a front surface facing the spatial intensity modulation structure, a rear surface, and an edge. Said backlight structure further comprises a light source optically connected to the edge of light guide and emitting light into the light guide, a broadband reflector capable of reflecting and randomizing light that is incident upon said reflector and which is situated on the rear surface of the light guide, the broadband rear interference polar (RI-Polar) situated on the front surface of the light guide, and a rear broadband sheet polarizer situated on the RI-Polar and having a transmission axis approximately parallel to the transmission axis AB. In another variant of the disclosed liquid crystal display panel the spatial intensity modulation structure further comprises a sequence of an array of polarization direction rotating elements neighboring with the backlight structure, and the broadband front interference polar (FI-Polar) neighboring with the spectral filtering structure. In still another variant of the disclosed liquid crystal display panel the pixel regions spatially encompass a plurality of subpixel regions, the spectral filtering structure further comprises a pixelated array of color filters, and the spatial intensity modulation structure includes a plurality of subpixel regions. In one embodiment the liquid crystal display panel further comprises an antireflection mean disposed on an external surface of said display panel. In a possible variant of the disclosed liquid crystal display panel the antireflection mean is a front broadband sheet polarizer having a transmission axis approximately parallel to the transmission axis AB.

Said backlight structure comprises a light source for producing light consisting of spectral components having wavelengths within the visible band of the electromagnetic spectrum and the polarizations of a-type and b-type. The backlight structure further comprises a broadband reflector intended for reflecting polarized light consisting of spectral components having wavelengths within said visible band upon one or more reflections within said backlight structure. This broadband reflector converts the polarization state of said spectral components from polarization state of a-type to the state of b-type orthogonal to the former polarization state and from polarization state of b-type to the state of a-type.

The plurality of pixel regions spatially encompasses a predefined display area definable relative to said backlight structure. Each said pixel region spatially encompasses a plurality of subpixel regions and each said subpixel region within each said pixel region has a predefined spectral band over the visible band of the electromagnetic spectrum.

The broadband rear interference polar (RI-Polar) is intended for reflecting light consisting of spectral components having wavelengths at least within said visible band and said polarization state of b-type, and for transmitting polarized light consisting of spectral components having wavelengths at least within said visible band and said polarization state of a-type.

Each said polarization direction rotating element is adjacent to one said subpixel region and selectively modifies the polarization state of polarized light transmitted through said polarization direction rotating element in response to a subpixel drive signal applied to said polarization direction rotating element.

The spatial intensity modulation structure further comprises a broadband front interference polar (FI-Polar). This FI-Polar is intended for reflecting light consisting of spectral components having wavelengths at least within said visible band and said polarization state of b-type, and for transmitting polarized light consisting of spectral components having wavelengths at least within said visible band and said polarization state of a-type and consequently cooperates with said array of polarization modifying elements. Thus, the FI-Polar modulates the spatial intensity of polarized light and thereby produces a "dark" or "bright" intensity level at each said subpixel region adjacent to said FI-Polar.

In one embodiment of the disclosed liquid crystal display panel, at least one layer of the RI-Polar is made of a fluorescent material converting ultraviolet radiation into visible light. In a possible variant of the disclosed liquid crystal display panel, at least one transparent layer of each said multilayer structures has a fundamental absorption edge below 400 nm. In another possible variant of the disclosed liquid crystal display panel, at least one transparent layer of each said multilayer structures has a transmission coefficient of not less than 0.98. In still another possible variant of the disclosed liquid crystal display panel, at least one transparent layer of each said multilayer structures is uniformly transparent in the wavelength band of visible light.

In another preferred embodiment, the present invention provides a liquid crystal display panel, wherein at least one optically anisotropic layer is treated with ions of divalent and/or trivalent metals in order to transfer said layer into an insoluble state. In another liquid crystal display panel the molecules of at least one organic compound material comprise heterocycles. In one variant of the disclosed invention, the liquid crystal display panel comprises at least one optically anisotropic layer manufactured from a lyotropic liquid crystal based on at least one dichroic dye.

In another variant of the disclosed liquid crystal display panel, said plurality of subpixel regions within each said spatially encompassing pixel region comprises a "red" subpixel region, a "green" subpixel region, and a "blue" subpixel region. Said "red" subpixel region transmits spectral components of light within "red" band and absorbs substantially all spectral components of light within "green" band and "blue" band, wherein said "green" subpixel region transmits spectral components of light within "green" band and absorbs substantially all spectral components of light within "red" band and "blue" band, and wherein said "blue" subpixel region transmits spectral components of light within "blue" band and absorbs substantially all spectral components of light within "red" band and "green" band.

In still another variant of the disclosed liquid crystal display panel, said plurality of subpixel regions within each said spatially encompassing pixel region comprises a "cyan" subpixel region, a "magenta" subpixel region, and a "yellow" subpixel region. Said "cyan" subpixel region absorbs spectral components of light within "red" band and transmits substantially all spectral components of light within "green" band and "blue" band, wherein said "magenta" subpixel region absorbs spectral components of light within "green" band and transmits substantially all spectral components of light within "red" band and "blue" band, and wherein said "yellow" subpixel region absorbs spectral components of light within "blue" band and transmits substantially all spectral components of light within "red" band and "green" band.

In a possible variant of the disclosed liquid crystal display panel, each said polarization-modifying element is made of liquid crystal material. In another possible variant of the liquid crystal display panel, said broadband reflector is a quasi-diffusive reflector.

In order that the invention may be more readily understood, reference is made to the following example, which is intended to be illustrative of the invention, but are not intended to be limiting in scope.

EXAMPLE 1

The typical interference polar (RI-Polar or FI-Polar) can be constructed using alternating layers of birefringent and isotropic materials deposited onto transparent substrate. Said polarizer has a transmission axis AB. If the unpolarized light is incident onto the broadband multilayer lossless polarizer, one part of this light, having the polarization approximately orthogonal to said transmission axis AB, is reflected from the broadband multilayer lossless polarizer. Desired performance can be achieved by manipulating the refractive index and thickness of each individual layer and the total number of layers. One of the most important aspects of the polarizer design is selection of the base structure. In the following consideration, normal incidence is assumed and the substrate index of refraction is fixed at 1.5. Typically, the broadband multilayer lossless polarizer can be designed in the form of a periodic structure of double layers with high and low refractive indices in the plane of polarization of the incident light. That is, the same pair of layers is repeatedly added until the performance is satisfactory. The structure is of the form: $(HL)^{N-1}H$, where H and L denote the high and low index layers, respectively, and N is the number of pairs. Here, we refer such a structure to as a cavity, which contains a total of N high-index layers. The structure yields maximum reflection at a certain wavelength, when the optical thickness (physical thickness multiplied by index) is equal to an odd number times a quarter of the wavelength (quarter-wave thickness).

It is obvious that a single cavity offers reflection narrowly concentrated around a single wavelength, with the bandwidth depending on the index contrast and the number of layers in the cavity. Therefore, multicavity structures are of interest. In such structures, each cavity centers at a different wavelength. Such structures can be written as $(H_1L_1)^{N-1}H_1C_{12}(H_2L_2)^{N-1}H_2C_{23}\ldots(H_mL_m)^{N-1}H_m$, where $C_{12}$ represents the coupling layer between cavity 1 and cavity 2. The $C_{12}$ value is usually chosen as the mean of $L_1$ and $L_2$. In addition, wavelength spacing between cavities should be chosen carefully based on the bandwidth of each cavity. The narrower the bandwidth, the smaller spacing should be chosen.

Figure 9:
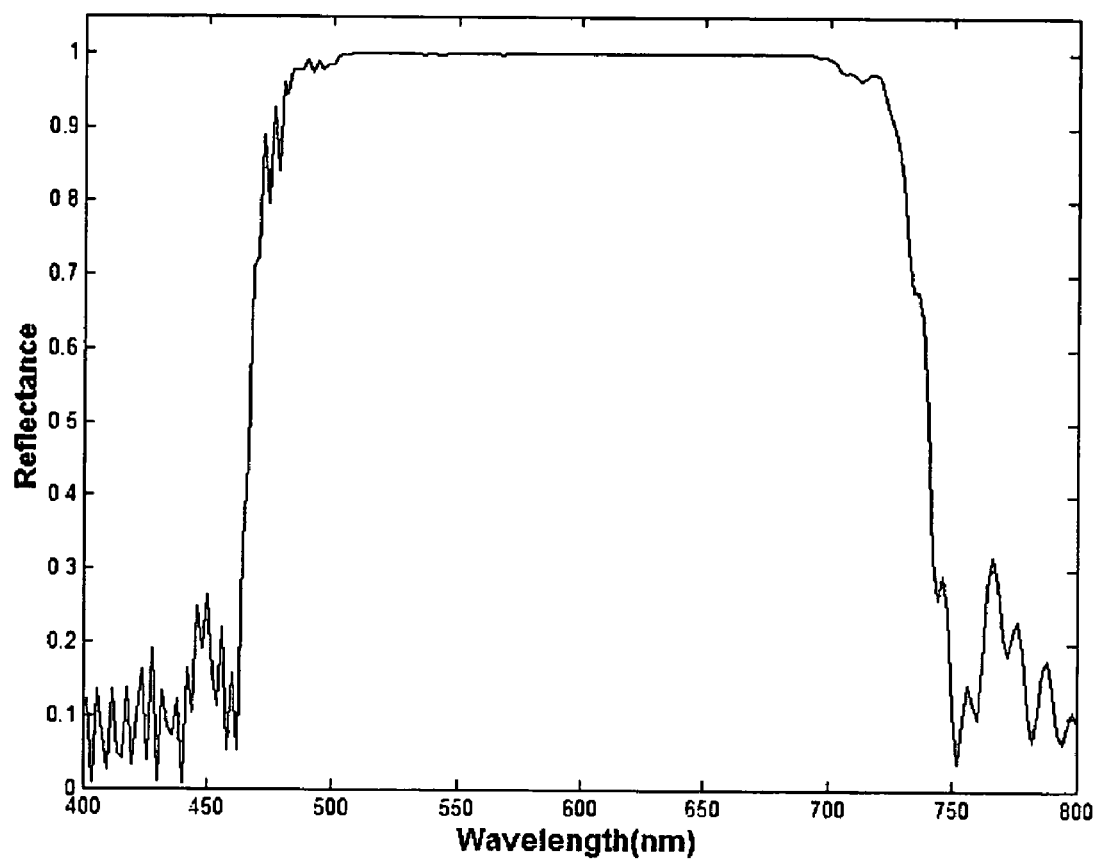
FIG. 9 shows the polarizer reflectance as a function of the wavelength for a structure of six quarter-wave cavities having 15 H-layers (the high index is fixed at 1.8 and the low index, at 1.5)

FIG. 9 shows the reflectance spectrum of a nearly perfect broadband multilayer lossless polarizer comprising six cavities with 15 H-layers in each cavity (a total of 95 H-layers). It can be seen that nearly 100% reflection is achieved in the band from 500 nm to 700 nm. If the high index is 2.2, we can achieve the same performance using only 4 cavities, each consisting of seven layers (a total of 28 H-layers). The high uniformity of the polarizer reflectance in a broad wavelengths band also contributes to the high quality of color rendering in a display employing such polarizer.

In all the above cases, the layer thickness is one quarter-wave in each cavity. Let us now reexamine the issue of increasing layer thickness. As was pointed out above, the bandwidth decreases as the layer thickness is increased. This implies that more cavities are needed to cover the same range of wavelengths. For example, if the thickness is to be three quarter-waves, it is necessary to use 11 cavities, each having 17 H-layers (a total of 187 H-layers), to achieve similar performances in FIG. 9. This more than doubles the number of layers as compared to that in the case of thinner layers.

The polarizer layers were obtained by means of Cascade Crystallization Process and analyzed to determine the optical characteristics of layers. A mixture of sulfoderivatives of acenaphtho[1,2-b]quinoxaline (12 g) was introduced with stirring at a temperature of 20° C. into 65.0 g of deionized water. Then, 5.3 ml of 25% aqueous ammonia solution were added and the mixture was stirred to complete dissolution. The electronic absorption spectrum of an aqueous solution of sulfonated acenaphtho[1,2-b]quinoxaline is presented in FIG. 10. The solution was concentrated on a rotary evaporator to 30% and layered on a glass substrate surface with a Mayer rod #2.5 at a linear rate of 15 mm/s, a temperature of 20° C. This process was performed at a relative humidity of 65%. Then, the film was dried at the same humidity and temperature.

Figure 10:
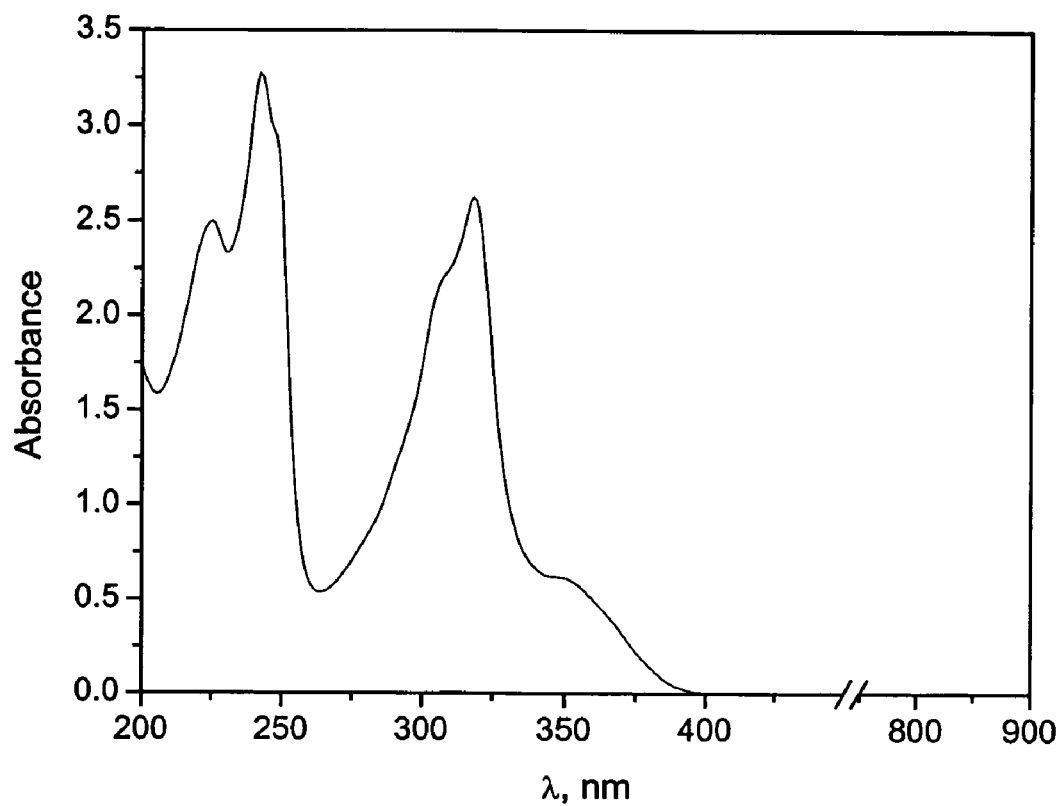
FIG. 10 is an absorption spectrum for aqueous solution of sulfonated acenaphtho[1,2-b]quinoxaline with a concentration 25 mg/l.
Figure 11:
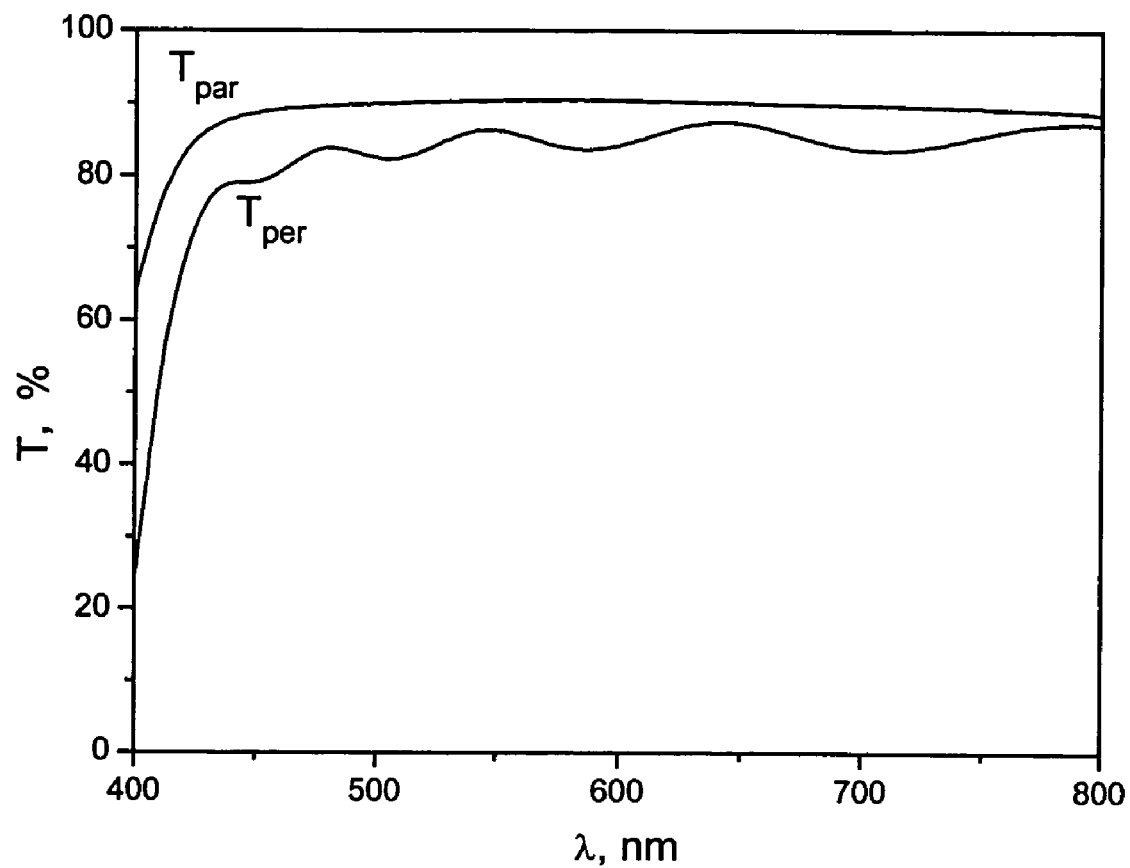
FIG. 11 is a transmission spectrum illustrating the dependence of the transmission coefficients vs. wavelength for a layer produced from the mixture of sulfonated acenaphtho[1,2-b]quinoxaline derivatives.

To determine optical characteristics of the film, optical transmission spectra were measured in polarized light in the wavelength range from 400 to 800 nm using a Cary-500 spectrophotometer (FIG. 11). We measured optical transmission of the film using the light linearly polarized parallel and perpendicular to the polarization axes (Tpar and Tper respectively) of the polarizer and analyzer. FIG. 10 demonstrates a very low absorbance of the film in the visible spectral range at wavelengths above 430 nm.

Figure 12:
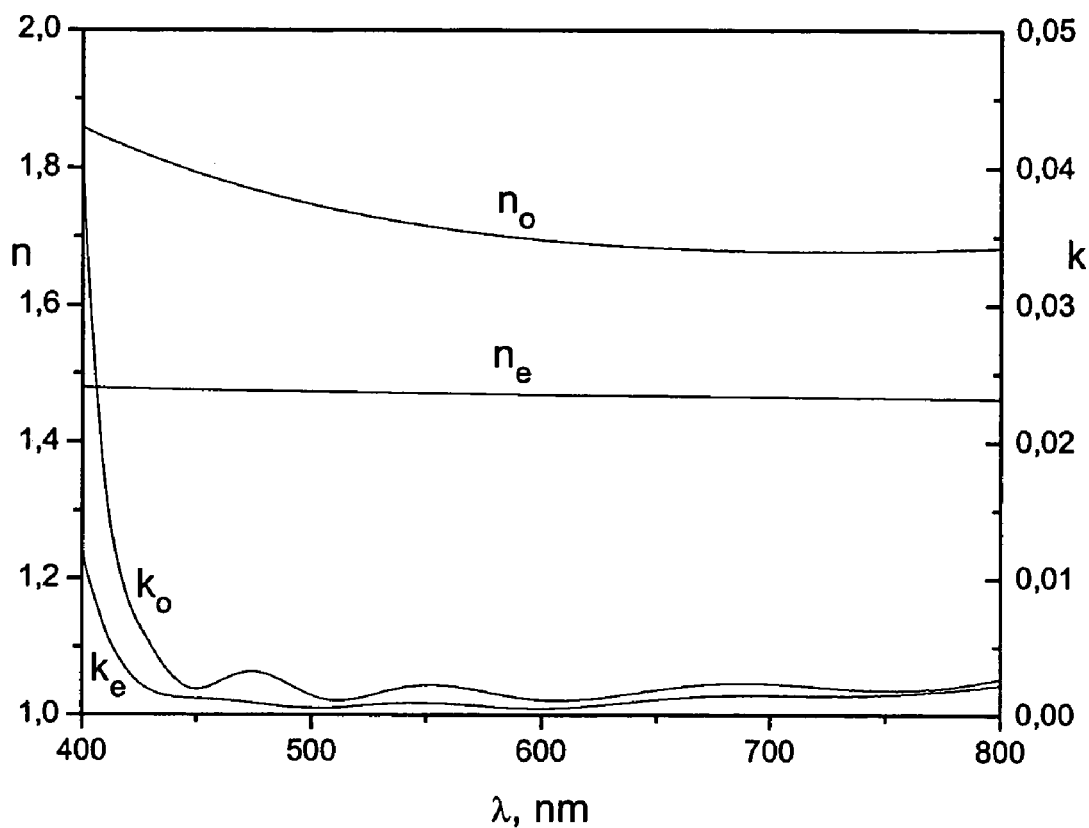
FIG. 12 shows the dependences of refraction indices ($n_e$, $n_o$) and absorption coefficients ($k_e$, $k_o$) on the wavelength for a layer produced from the mixture of sulfonated acenaphtho [1,2-b]quinoxaline derivatives, measured parallel and perpendicular to the alignment direction.

The obtained data were used to calculate the refractive indices ($n_e$, $n_o$) and absorption coefficients ($k_e$, $k_o$) for the light polarized parallel and perpendicular to the alignment direction. The calculated coefficients are presented in FIG. 12. The obtained layer is optically anisotropic and exhibits high retardation characteristic $\Delta n = n_o - n_e$ increasing from 0.21 up to 0.38 in the visible spectral range. The low values of the absorption coefficients $k_e$ and $k_o$ confirm high transparency of the layer.

EXAMPLE 2

The goal of experiments described below was to demonstrate the fabrication of I-Polar samples exhibiting maximum reflection of light polarized in one plane, while transmitting the light polarized in the perpendicular direction.

The structure of the stack was supposed to be of the form $(HL)^{N-1}H$, where H and L denote the high-index birefringent thin crystal film (TCF) and the low-index intermediate layer of isotropic material, respectively, and N is the number of such pairs. From a variety of candidates for intermediate layer, we selected CrystalCoat™ MP1175UV from SDC, Inc. The structure would produce the maximum reflection at a certain wavelength when the optical thickness (defined as the geometric thickness x multiplied by the refractive index n) is equal to an odd number of quarter-wavelengths (QW) thickness.

The samples were fabricated using Bordeaux 505sf ink from Optiva Inc. (Bordeaux MNL001563-55% and MNL002188-45%) with a solid content of 13.01%, from which a series of diluted inks was prepared with the concentrations 11, 10.5, 10, 9.5, 9 and 8%. Preliminary tests showed that the coating quality was quite good in the concentration range from 9 to 10.5 wt %, provided that the substrates were preliminary treated by plasma and were free of pinholes. It should be also mentioned that the coating quality strongly depends on the Meyer rod type. Thus, only HS2 rod provided a good appearance of coatings without serious manifestations of local thickness nonuniformities, which are readily observed for highly reflective Bordeaux ink-based TCFs. The TCFs could be converted into Ba-form without any problems.

Figure 13:
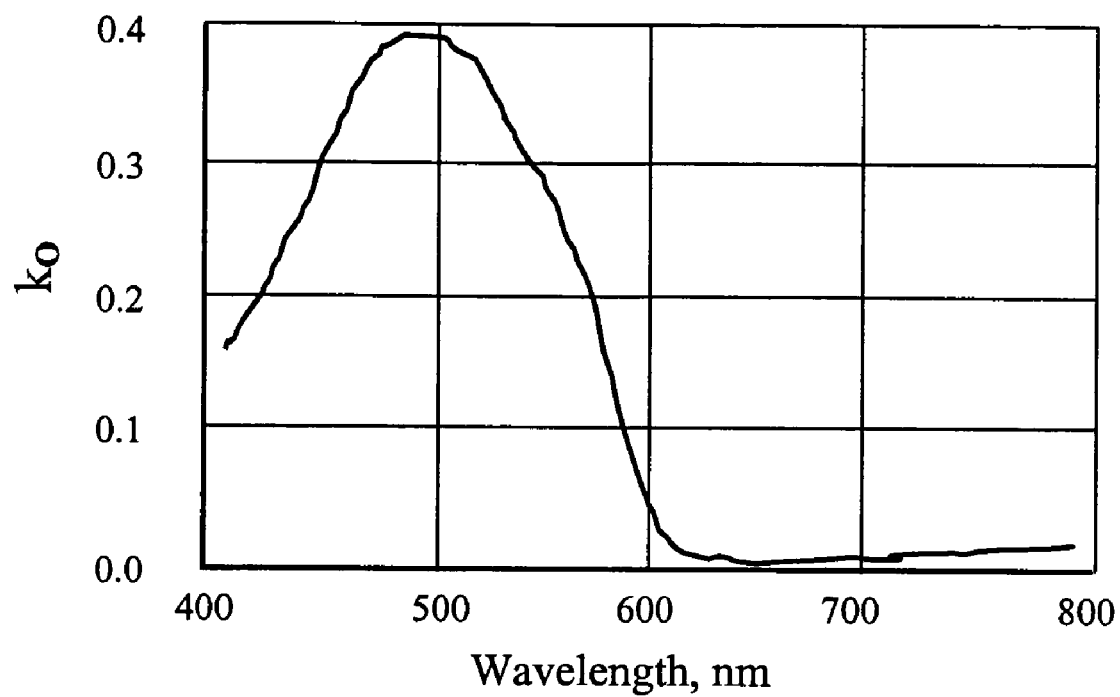
FIG. 13 shows the absorption coefficient used in simulation.
Figure 14:
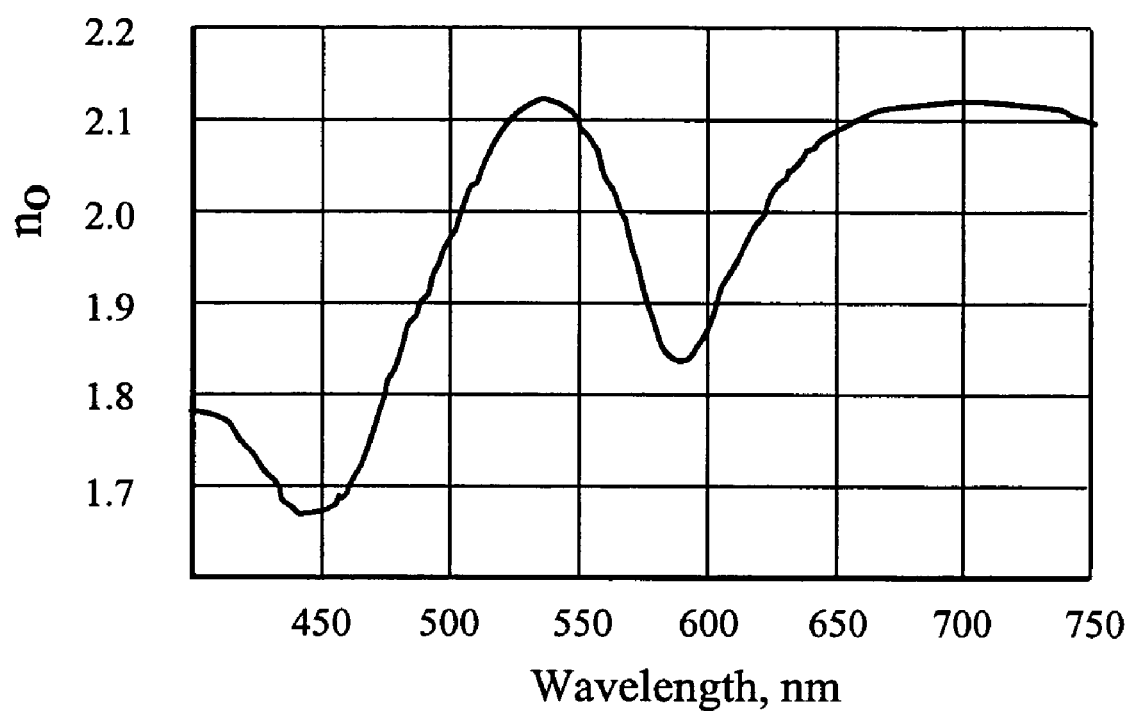
FIG. 14 shows the refractive indices used in simulation.

A series of coatings were prepared using different rods (HS1.5, HS2, MR2.5 and MR#3) and various ink concentrations (9, 9.5, 10, 10.5%). Optical parameters were measured using a Cary 500 spectrophotometer. FIG. 13 shows the absorption coefficient and FIG. 14 shows the refractive index $n_o$ ($n_e$=1.5), which were used in simulation.

From a variety of candidates for the intermediate layer, the CrystalCoat™ MP1175UV from SDC, Inc. has been selected. This is an ultraviolet light cured resistant coating material intended for dip- and spin-coating application. According to the typical values provided by manufacturer, the refractive index is 1.49. Chemically, this is a solution of acrylic acid in a mixture of organic solvents. Good coatings of this material were obtained using MR rolling and spin-coating (~8000 rpm) techniques. Curing was done with 3 passes under 6" UV lamp (300 wpi) at a ~15 fpm velocity.

TCF coating on top of the lacquer layer made of MP1175UV was good if the deposition was performed immediately after plasma pretreatment, otherwise problems with wettability appeared.

Initially, problems were encountered during the conversion of samples into the Ba-form: coatings exhibited delamination in the course of subsequent rinsing. However, these problems were eliminated by dipping the samples into a 1% APS solution after dipping in a 17.5% $BaCl_2$ tank.

Figure 15:
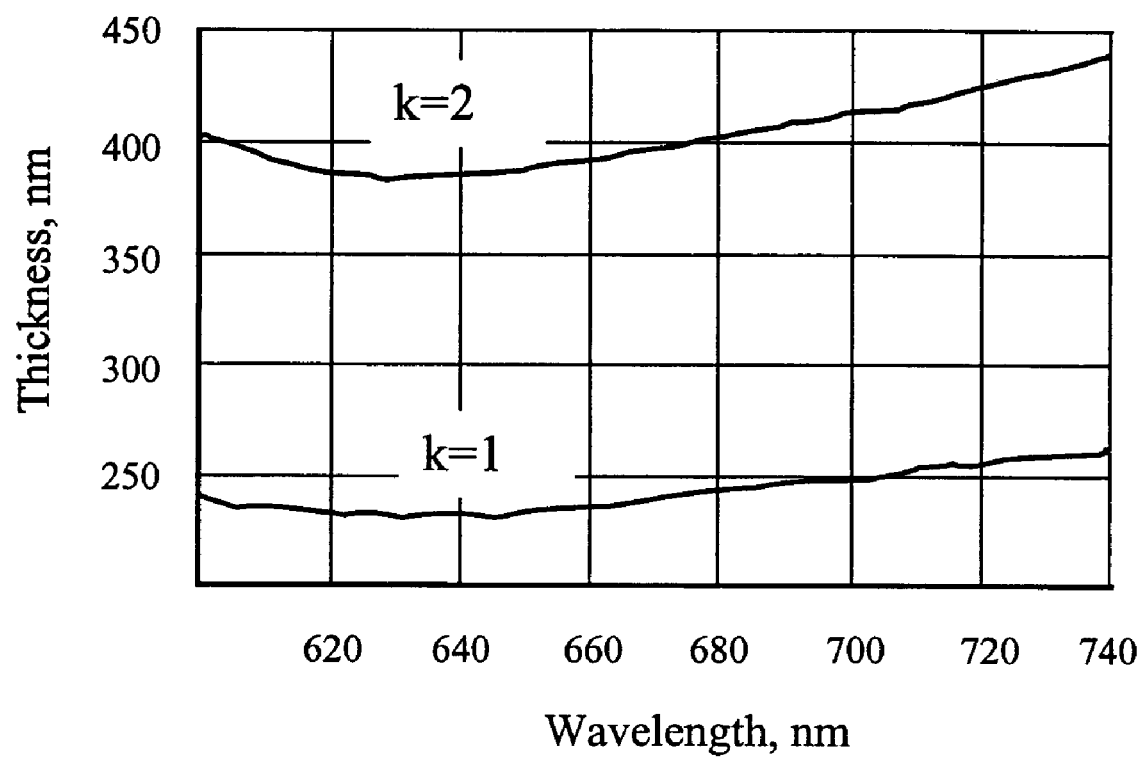
FIG. 15 shows the quarter wave thickness of TCF Bordeaux layer $\lambda(2k+1)/(4*n_o(\lambda))$ for k=1, 2.

The thickness of a birefringent film is determined as shown in FIG. 15. It should be noted that the operation with higher thicknesses is preferred. The used coating method allows to form layers having an optical thicknesses (physical thickness multiplied by refractive index) approximately equaled to $5\lambda/4$ (where $\lambda$ is wavelength~630 nm). For these reasons, a value of 390-400 nm was selected as the working film physical thickness.

Several samples of TCF/Lacquer/TCF structures have been prepared. Unfortunately, the second TCF application resulted in numerous cracks in the lacquer. It was found that a fixed Meyer rod scratched the surface of a very thin lacquer layer. This damage hindered obtaining a representative sample of multilayer coatings of this kind. The scratching problem is related to very small thickness of the lacquer layer, rather than to insufficient hardness of the lacquer. It was evident that the fixed MR technique of TCF application on top of a thin lacquer sublayer will cause scratches in any case. It was suggested that a non-contact technique would allow this sort of problems to be eliminated.

The rolling (MR) technique was used for coating TCF on top of the lacquer so as to avoid scratches. In this case, the scratches almost disappeared but the layer performance was reduced and the thickness non-uniformities have appeared.

Figure 16:
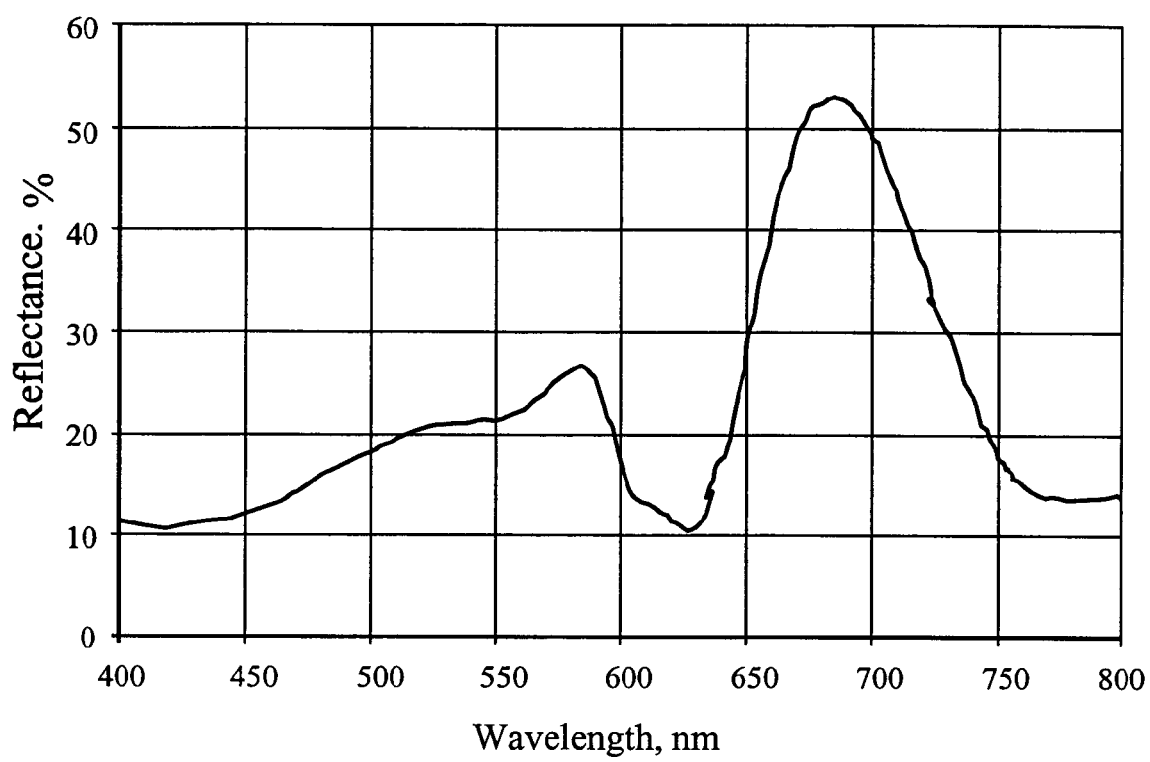
FIG. 16 shows the influence of light scattering on the reflectance of multilayer coatings.

Nevertheless, measurements showed (see FIG. 16) that the spectrum became smoother, with single peak in the 600-800 nm range. The maximum reflectance was 45-52%. It should be noted that the value of maximum reflectance depends on the quality of the measured surface region. Obviously, the reflectance is lower if the measured region contains scratches.

Figure 17:
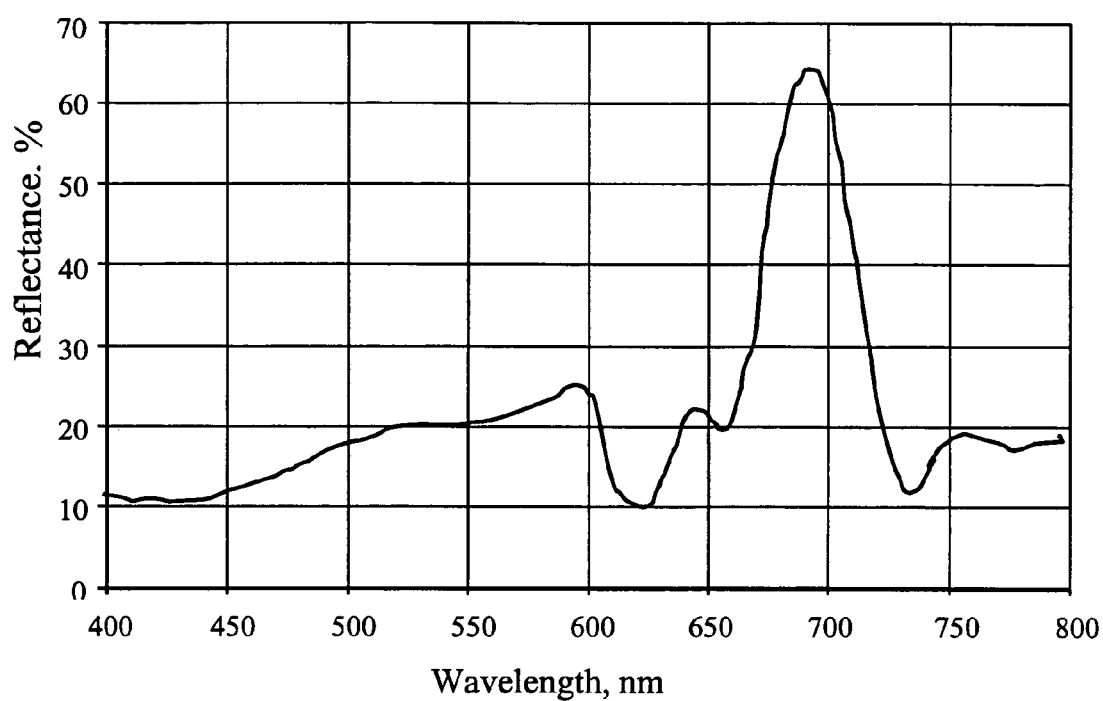
FIG. 17 shows the reflectance spectra of multilayer (3 TCF) coatings.
Figure 18:
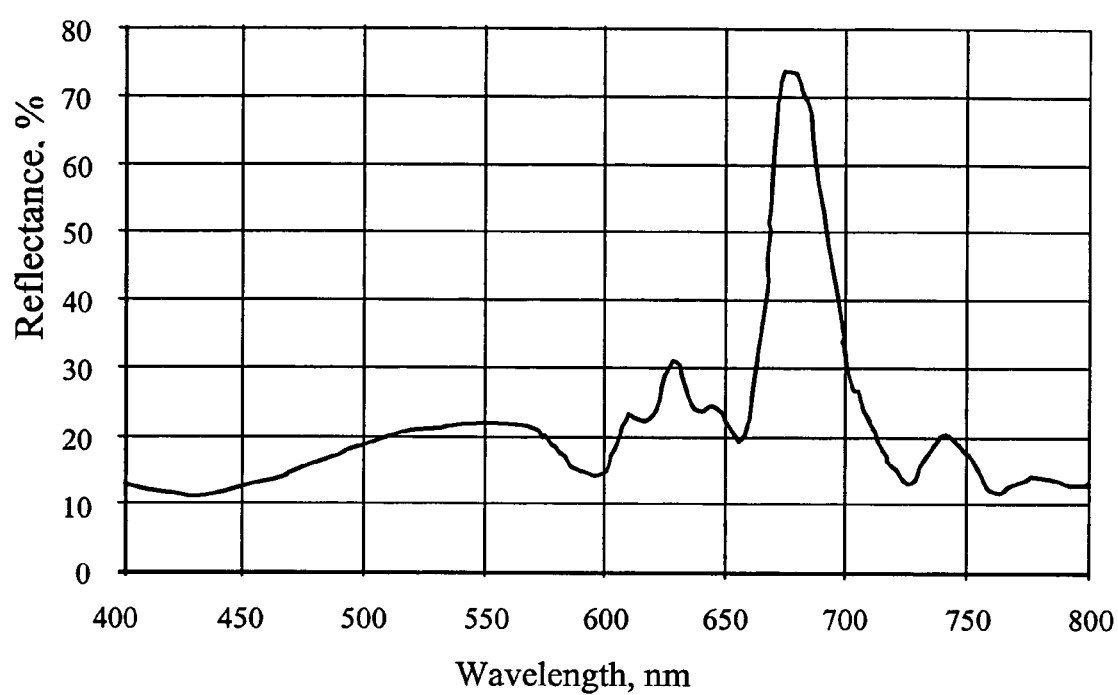
FIG. 18 shows the reflectance spectra of multilayer (4 TCF) coatings.

A stack with 3 TCF layers was made and the best 62% reflectance was obtained when light beam impinges (incidences) at 30 degrees with respect to normal of multilayer structure (FIG. 17). By applying a 360- to 420-nm-thick lacquer layer, a coating with 4 TCF layers was obtained (FIG. 18) with a 75% reflectance when light beam impinges (incidences) at 30 degrees with respect to normal of multilayer structure.

What is claimed is:

1. A liquid crystal display panel with improved image contrast comprising an array of pixel regions and a sequence of elements comprising a recycling backlight structure comprising a broadband rear interference polar (RI-Polar) having a transmission axis AB with preset orientation, a spatial intensity modulation structure for modulating the light of each pixel region, a broadband front interference polar (FI-Polar) having a transmission axis approximately parallel to the transmission axis AB, a spectral filtering structure associated with each said pixel region, wherein said RI-Polar and said FI-Polar are multilayer structures of stacked layers and at least one layer of each multilayer structure is optically anisotropic, being made by means of Cascade Crystallization Process and characterized by a globally ordered biaxial crystalline structure with an intermolecular spacing of 3.4±0.3Å in the direction approximately parallel to the transmission axis AB, is transparent in the wavelength band of visible light, and is formed by rodlike supramolecules which represent at least one polycyclic organic compound with a conjugated π-system and ionogenic groups, wherein at least one optically anisotropic layer is manufactured from a lyotropic liquid crystal based on at least one dichroic dye and said lyotropic liquid crystal comprises sulfoderivatives of acenaphto[1,2-b] quinoxaline.

2. The liquid crystal display panel according to claim 1, wherein the spatial intensity modulation structure further comprises an array of polarization direction rotating elements neighboring with the backlight structure, and wherein the broadband front interference polar (FI-Polar) neighboring with the spectral filtering structure.

3. The liquid crystal display panel according to claim 1, further comprising an antireflection mean disposed on an external surface of said display panel.

4. The liquid crystal display panel according to claim 1, wherein the pixel regions spatially encompass a plurality of subpixel regions, the spectral filtering structure further comprises a pixelated array of color filters, and the spatial intensity modulation structure includes a plurality of subpixel regions.

5. The liquid crystal display panel according to claim 1 or 4, wherein the backlight structure further comprises a light guide having a front surface facing the spatial intensity modulation structure, a rear surface, and an edge;

a light source optically connected to the edge of the light guide and emitting light into the light guide;

a broadband reflector capable of reflecting and randomizing light that is incident upon said reflector and which is situated on the rear surface of the light guide, the broadband rear interference polar (RI-Polar) situated on the front surface of the light guide; and a rear broadband sheet polarizer situated on the RI-Polar and having a transmission axis approximately parallel to the transmission axis AB.

6. The liquid crystal display panel according to claim 1 or 4, wherein at least one layer of the RI-Polar is made of a fluorescent material converting ultraviolet radiation into visible light.

7. The liquid crystal display panel according to claim 1 or 4, wherein at least one transparent layer of each said multilayer structure has a fundamental absorption edge below 400 nm.

8. The liquid crystal display panel according to claim 1, wherein at least one transparent layer of each said multilayer structure has a transmission coefficient of not less than 0.98.

9. The liquid crystal display panel according to claim 1, wherein at least one transparent layer of each said multilayer structure is uniformly transparent in the wavelength band of visible light.

10. The liquid crystal display panel according to claim 1, wherein at least one optically anisotropic layer is treated with ions of divalent and/or trivalent metals.

11. The liquid crystal display panel according to claim 1, wherein molecules of at least one organic compound material comprise heterocycles.

12. The liquid crystal display panel according to claim 4, wherein said plurality of subpixel regions within each said spatially encompassing pixel region comprises a "red" subpixel region, a "green" subpixel region, and a "blue" subpixel region.

13. The liquid crystal display panel of claim 12, wherein said "red" subpixel region transmits spectral components of light within "red" band and absorbs substantially all spectral components of tight within "green" band and "blue" band, wherein said "green" subpixel region transmits spectral components of light within "green" band and absorbs substantially all spectral components of light within "red" band and "blue" band, and wherein said "blue" subpixel region transmits spectral components of light within "blue" band and absorbs substantially all spectral components of light within "red" band and "green" band.

14. The liquid crystal display panel of claim 4, wherein said plurality of subpixel regions within each said spatially encompassing pixel region comprise a "cyan" subpixel region, a "magenta" subpixel region, and a "yellow" subpixel region.

15. The liquid crystal display panel of claim 14, wherein said "cyan" subpixel region absorbs spectral components of light within "red" band and transmits substantially all spectral components of light within "green" band and "blue" band, wherein said "magenta" subpixel region absorbs spectral components of light within "green" band and transmits substantially all spectral components of light within "red" band and "blue" band, and wherein said "yellow" subpixel region absorbs spectral components of light within "blue" band and transmits substantially all spectral components of light within "red" band and "green" band.

16. The liquid crystal display panel of claim 2, wherein each said polarization direction rotating element is made of a liquid crystal material.

17. The liquid crystal display panel of claim 5, wherein said broadband reflector is a quasi-diffusive reflector.

18. The liquid crystal display panel according to claim 3, wherein the antireflection mean is a front broadband sheet polarizer having a transmission axis approximately parallel to the transmission axis AB.

19. The liquid crystal display panel according to claim 9, wherein at least the one transparent layer of each said multilayer structure shows transmission coefficient varying not more than 5% across a wavelength range of 450-800 nm to parallel polarized light.

20. The liquid crystal display panel according to claim 9, wherein at least the one transparent layer of each said multilayer structure shows transmission coefficient of not less than 75% across a wavelength range of 450-800 nm to perpendicularly polarized light.

* * * * *